United States Patent
Jeong et al.

(10) Patent No.: US 11,635,865 B2
(45) Date of Patent: Apr. 25, 2023

(54) DISPLAY DEVICE AND METHOD OF DRIVING THE SAME

(71) Applicant: Samsung Display Co., Ltd., Yongin-si (KR)

(72) Inventors: Su Hyun Jeong, Asan-si (KR); Ja Seung Ku, Seoul (KR); Soo Won Kim, Cheonan-si (KR); Ye Rin Oh, Ulsan (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/444,807

(22) Filed: Aug. 10, 2021

(65) Prior Publication Data

US 2022/0083176 A1 Mar. 17, 2022

(30) Foreign Application Priority Data

Sep. 16, 2020 (KR) ........................ 10-2020-0118777

(51) Int. Cl.
*G06F 3/041* (2006.01)
*G06F 3/044* (2006.01)

(52) U.S. Cl.
CPC .......... *G06F 3/0447* (2019.05); *G06F 3/0412* (2013.01); *G06F 3/04164* (2019.05); *G06F 2203/04102* (2013.01)

(58) Field of Classification Search
None
See application file for complete search history.

(56) References Cited

U.S. PATENT DOCUMENTS 10,095,345 B2 * 10/2018 Bokma .............. G06F 3/041661
2013/0127917 A1 * 5/2013 Kwack ................ G06F 1/1652
345/660

FOREIGN PATENT DOCUMENTS

| KR | 10-1400298 B1 | 6/2014 |
| KR | 10-2014-0115226 A | 9/2014 |
| KR | 10-2017-0058507 A | 5/2017 |
| KR | 10-2017-0069022 A | 6/2017 |
| KR | 10-2018-0014386 A | 2/2018 |

* cited by examiner

*Primary Examiner* — Brian M Butcher
(74) *Attorney, Agent, or Firm* — Lewis Roca Rothgerber Christie LLP

(57) ABSTRACT

A display device and a method of driving a display device. The display device includes a housing, a display touch module including a non-exposed area covered by the housing, an exposed area located outside the housing, and an active area over the non-exposed area and the exposed area. The display touch module includes a display member configured to display an image and a touch member on the display member configured to sense a touch input. The display device also includes a boundary determining member configured to sense a capacitance of the touch member and calculate coordinates of an exposure boundary between the exposed area and non-exposed area of the display touch module. The display device is configured to adjust a display range of the active area according to the coordinates of the exposure boundary calculated by the boundary determining member.

18 Claims, 16 Drawing Sheets

FIG. 1
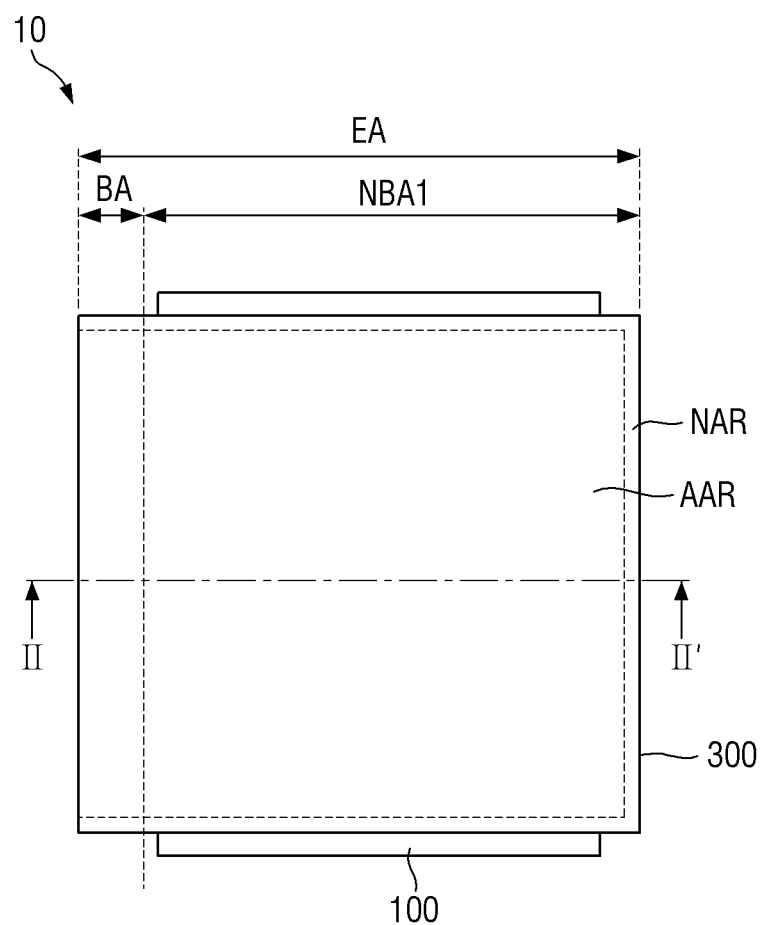
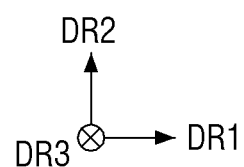

FIG. 2
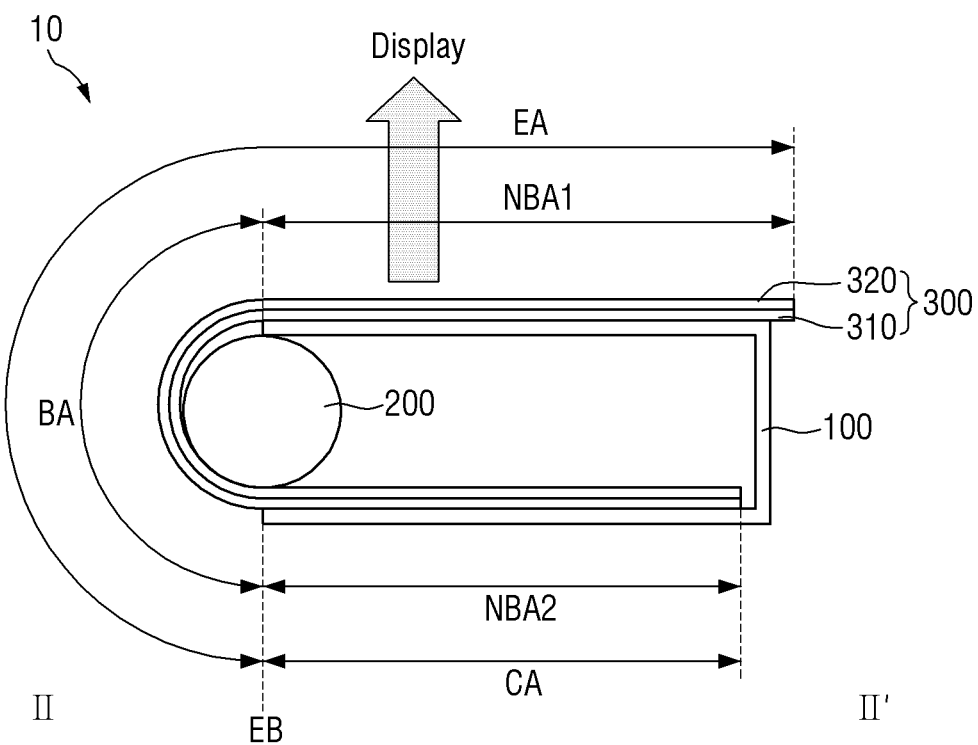
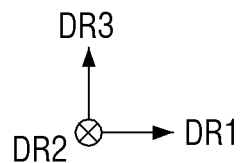

FIG. 3
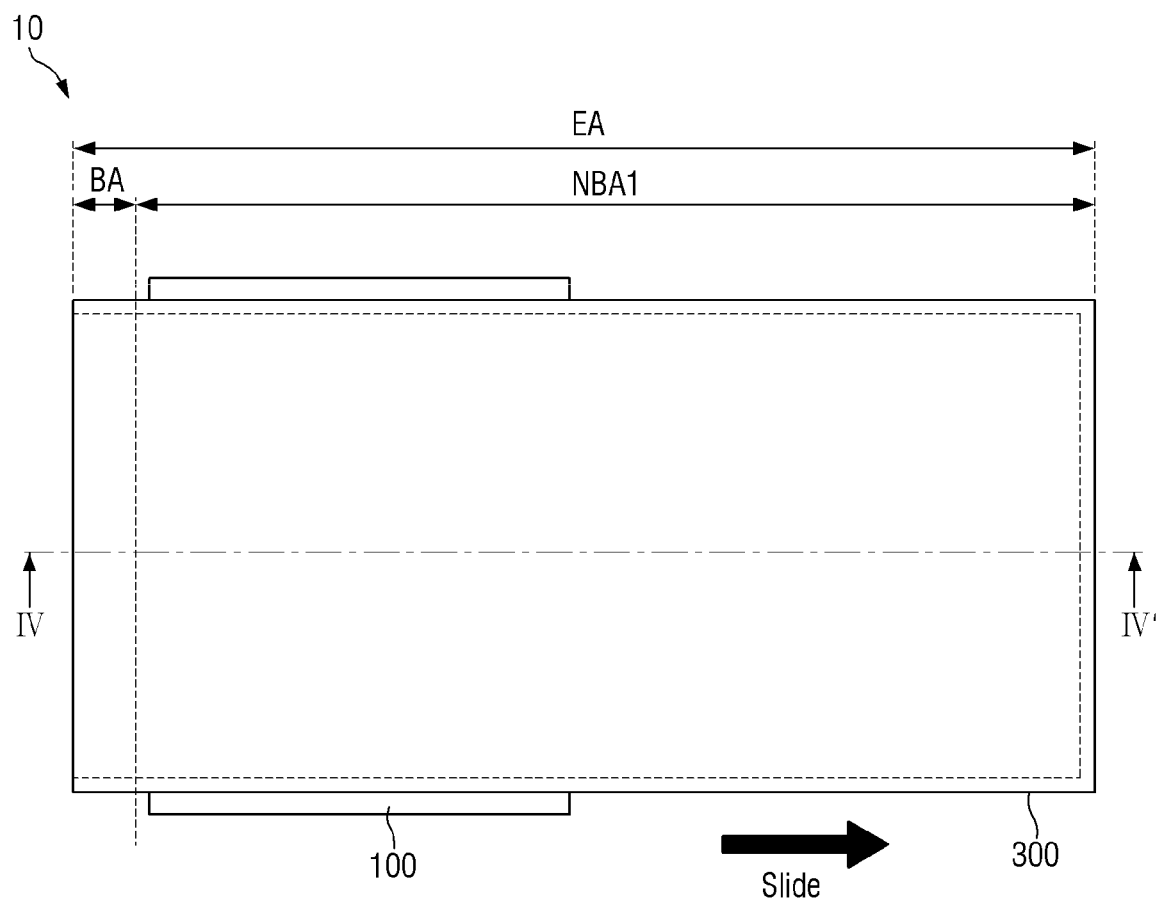
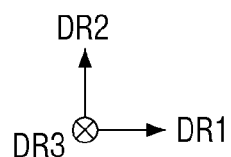

FIG. 4
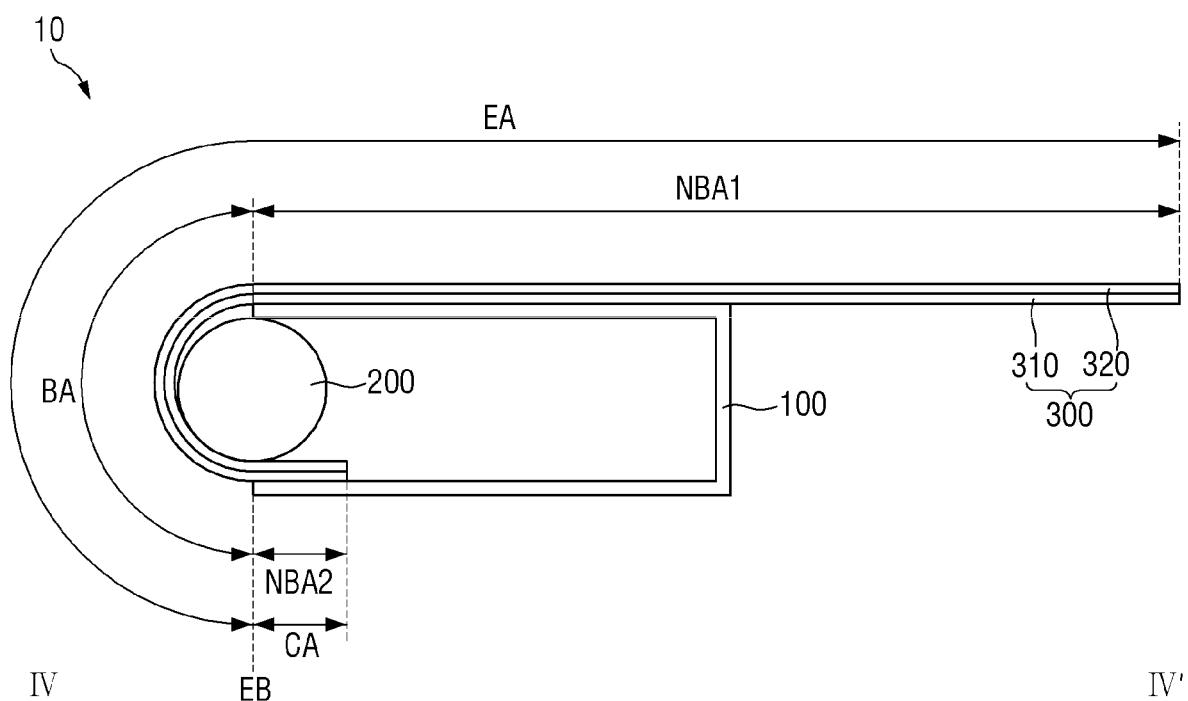
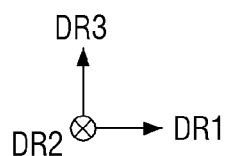

DISPLAY DEVICE AND METHOD OF DRIVING THE SAME

CROSS-REFERENCE TO RELATED APPLICATION

This application claims priority to and the benefit of Korean Patent Application No. 10-2020-0118777 filed on Sep. 16, 2020 in the Korean Intellectual Property Office, the contents of which in its entirety are herein incorporated by reference.

BACKGROUND

1. Field

The present disclosure relates to a display device and a method of driving the same.

2. Description of the Related Art

Electronic appliances such as smart phones, tablet PCs, digital cameras, notebook computers, navigators, and smart televisions, which provide images to users, include display devices for displaying images.

Users want a small display device to be portable, but they also want to be able to view an image on a large screen. In order to satisfy easy portability and a large screen, a display device configured to fold or expand a flexible display panel has been developed.

A display device includes a display panel generating and displaying an image, and various input devices. Recently, in the fields of smart phones and table PCs, a touch panel recognizing a touch input has been widely applied to a display device.

SUMMARY

Aspects of the present disclosure relate to various embodiments of a display device, in which, even if an area exposed to the outside of a displayable area can expand and contract, an externally exposed area and a concealed or covered area varying according to expansion and contraction can be easily distinguished, and an image can be displayed only in the exposed area.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

An embodiment of a display device includes a housing, a display touch module including a non-exposed area covered by the housing, an exposed area located outside the housing, and an active area over the non-exposed area and the exposed area. The display touch module including a display member configured to display an image and a touch member on the display member configured to sense a touch input. The display device also includes a boundary determining member configured to sense a capacitance of the touch member and calculate coordinates of an exposure boundary between the exposed area and non-exposed area of the display touch module. The display device is configured to adjust a display range of the active area according to the coordinates of the exposure boundary calculated by the boundary determining member.

An embodiment of a method of driving a display device, which includes a display touch module including a display member displaying an image and a touch member on the display member and configured to sense a touch input, the display touch module including a non-exposed area covered by a housing and an exposed area located outside the housing, includes measuring a capacitance of the touch member and determining coordinates of an exposure boundary between the exposed area and the non-exposed area, and adjusting an area of the display member displaying the image according to the coordinates of the exposure boundary.

In a display device according to an embodiment of the present disclosure, even if an active area of a display exposed to the outside (and thus visible to a user) can expand and contract, the externally exposed area and the concealed or covered active area of the display that vary according to expansion and contraction can be easily distinguished, and an image can be displayed only in the exposed active area of the display.

Although the embodiments of the present disclosure have been disclosed for illustrative purposes, those skilled in the art will appreciate that various modifications, additions and substitutions are possible, without departing from the scope and spirit of the invention as disclosed in the accompanying claims.

BRIEF DESCRIPTION OF THE DRAWINGS

The above and other aspects and features of the present disclosure will become more apparent by describing in detail embodiments thereof with reference to the attached drawings, in which:

FIG. 1 is a plan view of a display device according to an embodiment of the present disclosure;

FIG. 2 is a cross-sectional view taken along the line II-II' of FIG. 1;

FIG. 3 is a plan view of a display device according to another embodiment of the present disclosure;

FIG. 4 is a cross-sectional view taken along the line IV-IV' of FIG. 3;

DETAILED DESCRIPTION

Figure 5:
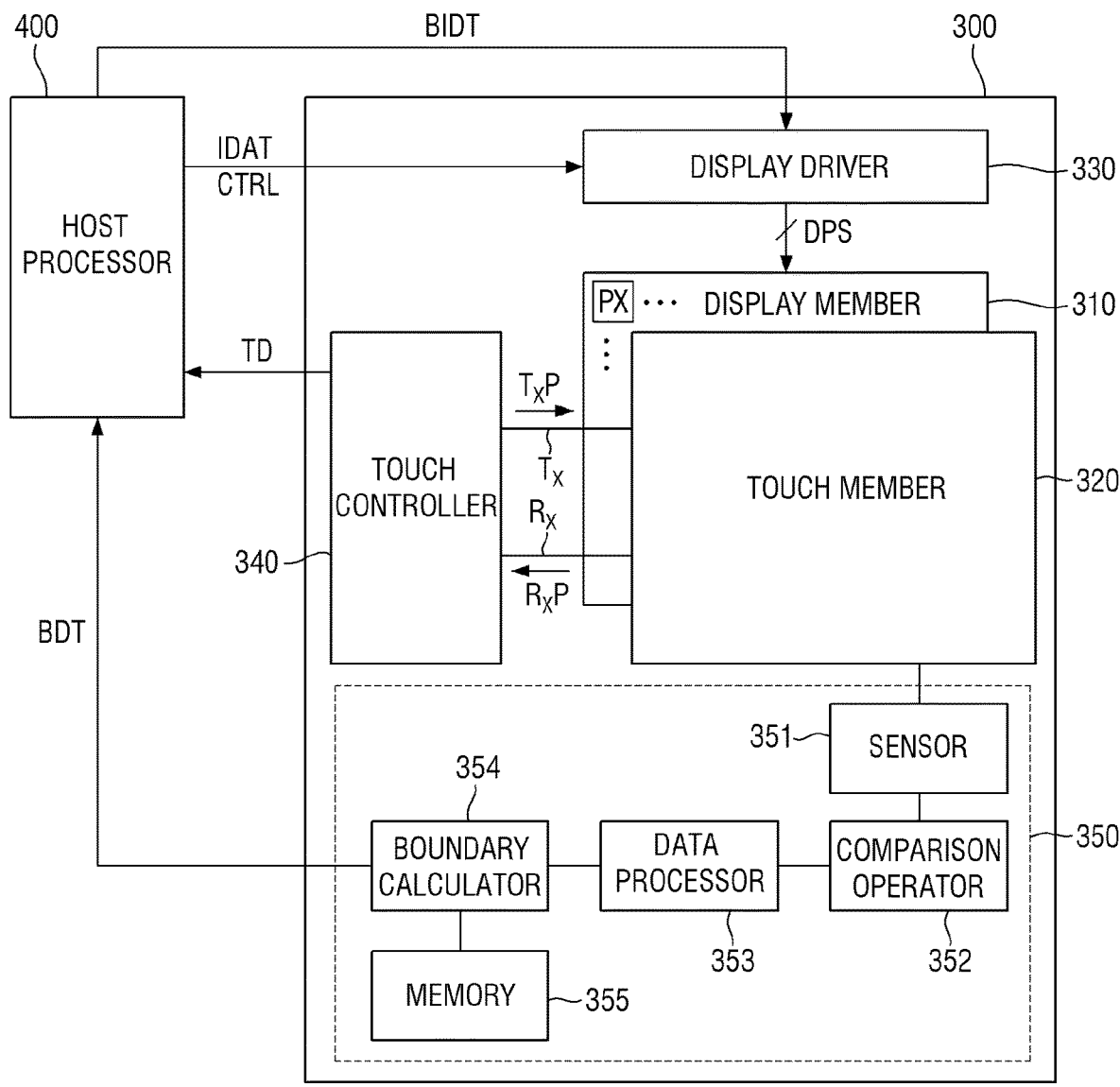
FIG. 5 is a block diagram of a display panel according to an embodiment of the present disclosure.

The present disclosure will now be described more fully hereinafter with reference to the accompanying drawings, in which embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification. In the attached figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

Hereinafter, embodiments of the present disclosure will be described with reference to the attached drawings.

FIG. 1 is a plan view of a display device according to an embodiment of the present disclosure. FIG. 2 is a cross-sectional view taken along the line II-II' of FIG. 1. FIG. 1 illustrates an initial state of a display touch module 300 of a display device 10.

Referring to FIGS. 1 and 2, the first direction DR1 indicates a horizontal direction of the display device 10 in a plan view, and the second direction DR2 indicates a vertical direction of the display device 10 in a plan view. Further, the third direction DR3 indicates a thickness direction of the display device 10. The first direction DR1 and the second direction DR2 perpendicularly intersect each other, and the third direction DR3 perpendicularly intersects both the first direction DR1 and the second direction DR2 in a direction intersecting the plane on which the first direction DR1 and the second direction DR2 are placed (i.e., the first, second, and third directions DR1, DR2, and DR3 are mutually orthogonal). However, it should be understood that the directions mentioned in embodiments refer to relative directions, and the embodiments are not limited to the mentioned directions.

Unless otherwise defined, in the present specification, the terms "upper", "on", or "over" expressed based on the third direction DR3 refer to a side of a display surface on which the display touch module 300 is located, and the terms "lower", "beneath", or "under" expressed based on the third direction DR3 refer to a side opposite to the display surface on which the display touch module 300 is located.

The display device 10 according to an embodiment may include various devices including an active area AAR that displays a screen or an image through the active area AAR to be described later and detects a touch input. The display device 10, which is a device for displaying a moving image or a still image, may be used as a display screen of various products, such as televisions, notebooks, monitors, billboards, internet of things (IOTs) as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs (UMPCs).

The display device 10 may include a housing 100, a guide roller 200, and a display touch module 300. The housing 100 may serve to accommodate and protect several components of the display device 10. For example, at least a part of the display touch module 300 may be disposed inside the housing 100, and a part of the display touch module 300 may be disposed on the housing 100 outside the housing 100. In addition, the guide roller 200 may be disposed inside the housing 100.

The guide roller 200 may support a bending area BA of the display touch module 300. In other words, the guide roller 200 may serve to maintain the display touch module 300 in a bent state. The guide roller 200 may be physically connected to the housing 100. The guide roller 200 may rotate and, accordingly, the display touch module 300 may be slid. Details thereof will be described later.

The display touch module 300 may include a display member 310 and a touch member 320 on the display member 310. The display member 310 may display a screen or an image. Examples of the display member 310 may include not only self-light emitting display panels such as an organic light emitting display panel (OLED), an inorganic light emitting display panel (inorganic EL), a quantum dot light emitting display (QED) panel, a micro LED display panel, a nano LED display panel (nano-LED), a plasma display panel (PDP), a field emission display panel (FED), and a cathode ray display panel (CRT), but also light-receiving display panels such as a liquid crystal display panel (LCD) and an electrophoretic display panel (EPD).

Hereinafter, an organic light emitting display panel is used as the display member 310 as an example, and the organic light emitting display panel applied to embodiments will be simply referred to as a display panel unless special classification is required. However, embodiments are not limited to an organic light emitting display panel, and other display panels listed above or known in the art may be utilized.

The touch member 320 may sense a touch input. The touch member 320 may be disposed on the display member 310. The touch member 320 may be provided integrally with the display member 310. In other words, the touch member 320 may be directly disposed on a thin film encapsulation layer (not shown) of the display member 310. However, the present disclosure is not limited thereto, and the touch member 320 may be provided as a separate panel or film to be attached to the display member 310.

The touch member 320 may detect and distinguish between an exposed area EA and non-exposed area CA of the display touch module 300. For example, the touch member 320 may distinguish the exposed area EA and the non-exposed area CA by sensing a difference in capacitance between the exposed area EA and the non-exposed area CA. Accordingly, a portion of the display member 310, on which the screen is displayed, may be adjusted depending on the exposed area EA and the non-exposed area CA of the display member 310. Details thereof will be described later.

The display touch module 300 includes an active area AAR and a non-active area NAR. The active area AAR of the display touch module 300 may include a display area for displaying a screen (static or dynamic images). Further, when the display touch module 300 has a touch function, a touch area, which is an area in which a touch input is sensed, may also be included in the active area AAR. Hereinafter, it is described that the active area AAR includes both a display area for displaying a screen (static or dynamic images) and a touch area for sensing a touch input, but the present disclosure is not limited thereto.

The shape of the active area AAR may correspond to the shape of the display touch module 300 to which the active area AAR is applied. The active area AAR may include a plurality of pixels. The plurality of pixels may be arranged in a matrix configuration. Each pixel may have a rectangular or square shape, but the shape thereof is not limited thereto.

The non-active area NAR may surround the active area AAR. The non-active area NAR may include a non-display area in which no display is made and a non-touch area in which a touch input is not sensed. However, the present disclosure is not limited thereto. The non-active area NAR may surround the active area AAR, but is not limited thereto, and the non-active area NAR may not be disposed outside of or around at least a part of the active area AAR. The bezel area of the display touch module 300 may be configured as the non-active area NAR.

The display touch module 300 may be a flexible display touch module. That is, the display touch module 300 may be a display touch module capable of bending, folding, and/or rolling.

The display touch module 300 may include a bending area BA, a first non-bending area NBA1, and a second non-bending area NBA2. The bending area BA may extend in a direction parallel to one side of the display touch module 300. For example, the bending area BA may extend in the second direction DR2, and may have a predetermined width in the first direction DR1. The width of the bending area BA in the first direction DR1 may be smaller than the length of the bending area BA extending in the second direction DR2.

The first non-bending area NBA1 and the second non-bending area NBA2 may be located around the bending area BA. For example, the first non-bending area NBA1 and the second non-bending area NBA2 may be located at one side and the other side of the bending area BA with the bending area BA interposed therebetween (e.g., the first non-bending area NBA1 and the second non-bending area NBA2 may be located at opposite sides or ends of the bending area BA).

The bending area BA/non-bending area NBA1 and NBA2 and the active area AAR/non-active area NAR of the display touch module 300, described above, may overlap each other at a given location. For example, a specific or particular location may be the active area AAR, and simultaneously may be the first non-bending area NBA1. Further, another specific or particular location may be the non-active area NAR, and simultaneously may be the first non-bending area NBA1. Further, still another specific or particular location may be the active area AAR, and simultaneously may be the bending area BA.

The active area AAR of the display touch module 300 may be disposed over both the first non-bending area NBA1 and the second non-bending area NBA2. Moreover, the active area AAR may also be located in the bending area BA corresponding to a boundary or interface between the first non-bending area NBA1 and the second non-bending area NBA2. That is, the active area AAR of the display touch module 300 may be continuously disposed irrespective of the boundary or interface of the non-bending areas NBA1 and NBA2 and the bending area BA. However, the present disclosure is not limited thereto. The active area AAR may be located only in one of the first non-bending area NBA1 and the second non-bending area NBA2, or the active area AAR may be disposed in the first non-bending area NBA1 and the second non-bending area NBA2, but may not be disposed in the bending area BA.

The display touch module 300 may be bent in the bending area BA. In such an embodiment, the first non-bending area NBA1 and the second non-bending area NBA2 may overlap in the thickness direction (third direction DR3), and the display member 310 and the touch member 320 of the display touch module 300 may be bent to form a cross-sectional curve (e.g., a semi-circle) along the width direction (first direction DR1) of the bending area BA.

FIGS. 1 and 2 illustrate a state in which the display touch module 300 is out-bent or out-folded. When the display touch module 300 is out-bent, the first non-bending area NBA1 and second non-bending area NBA2 of the display touch module 300 are bent such that their rear surfaces face each other, and the area on which the screen of the display touch module 300 is displayed is not covered and is exposed to the outside to be visible by a user. In other words, when the display touch module 300 is out-bent, the display touch module 300 may display a screen toward the outside of the display touch module 300.

In a state in which the display touch module 300 is bent, at least a part of the display touch module 300 may be disposed inside the housing 100. For example, the present disclosure is not limited thereto, but at least a part of the second non-bending area NBA2 of the display touch module 300 may be disposed inside the housing 100, and may be covered by the housing 100 when the display touch module 300 is bent.

In the display touch module 300, the area covered by the housing 100 may be referred to as a non-exposed area CA, and the area not covered by the housing 100 and exposed to the outside may be referred to as an exposed area EA. An exposure boundary EB may be located between the exposed area EA and the non-exposed area CA. The non-exposed area CA may include the second non-bending area NBA2, and the exposed area EA may include the bending area BA and the first non-bending area NBA1. However, the present disclosure is not limited thereto, and the non-exposed area CA may further include a part of the bending area BA, or may further include a part of the bending area BA and a part the first non-bending area NBA1.

The exposed area EA/non-exposed area CA and the active area AAR/non-active area NAR of the display touch module 300, described above, may overlap each other at a given location. For example, a specific or particular location may be the active area AAR, and simultaneously may be the exposed area EA. Further, another specific or particular location may be the non-active area NAR, and simultaneously may be the exposed area EA.

The active area AAR of the display touch module 300 may be disposed over both the exposed area EA and the non-exposed area CA. That is, the active area AAR of the display touch module 300 may be continuously disposed irrespective of the boundary (exposure boundary EB) between the exposed area EA and the non-exposed area CA.

The exposed area (EA)/non-exposed area (CA) and the bending area (BA)/non-bending areas NBA1 and NBA2 of the display touch module 300 are not fixed, and may be changed by sliding the display touch module 300. Details thereof will be described with reference to FIGS. 3 and 4.

FIG. 3 is a plan view of a display device according to another embodiment of the present disclosure. FIG. 4 is a cross-sectional view taken along the line IV-IV' of FIG. 3. FIG. 3 illustrates a configuration in which the display touch module 300 of the display device 10 slides.

Further referring to FIGS. 3 and 4, as the display touch module 300 slides toward one side in the first direction DR1, the exposed area EA of the display touch module 300 may expand or increase, and the non-exposed area CA thereof may contract or decrease. In other words, the display touch module 300 disposed outside the housing 100 may slide toward one side in the first direction DR1 and, accordingly, at least a portion of the display touch module 300 located inside the housing 100 may be exposed to the outside of the housing 100. That is, as the display touch module 300 slides, the exposure boundary EB may move. When the display touch module 300 slides, the display touch module 300 may slide more smoothly while rotating the guide roller 200.

Further, as the portion of the display touch module 300 disposed outside the housing 100 slides toward one side in the first direction DR1, the position of the bending area BA of the display touch module 300 may change, the first non-bending area NBA1 may expand (increase or elongate), and the second non-bending area NBA2 may contract (decrease). In other words, as the portion of the display touch module 300 disposed outside the housing 100 slides toward one side in the first direction DR1, it may be understood that the bending area BA disposed between the first non-bending area NBA1 and the second non-bending area NBA2 has moved in the opposite direction.

Although it is illustrated in FIGS. 3 and 4 that the display touch module 300 slides toward one side in the first direction DR1, and thus the exposed area EA and the first non-bending area NBA1 expand or increase, the present disclosure is not limited thereto. For example, the portion of the display touch module 300 disposed outside the housing 100 may slide toward the other side in the first direction DR1, and in this case, the exposed area EA and the first non-bending area NBA1 may contract or decrease, and the non-exposed area CA and the second non-bending area NBA2 may expand or increase.

Even when a screen is displayed, the non-exposed area CA of the display touch module 300 may be covered by the housing 100, and thus the user may not be able to recognize the screen (e.g., if an image is displayed on the entire active area AAR, then a user would not be able to see the portion of the image in the non-exposed area CA). Accordingly, it is required to detect the exposed area EA of the active area AAR of the display touch module 300 and display the screen (static or dynamic image(s)) only in the exposed area EA of the active area AAR. Further, it is required to accurately detect the coordinates of the exposure boundary EB in order to detect the exposed area EA that expands and contracts according to the sliding of the display touch module 300, as described above. The coordinates of the exposure boundary EB may be detected by the touch member 320. Details thereof will be described later.

FIG. 5 is a block diagram of a display panel according to an embodiment.

Referring to FIG. 5, the display touch module 300 may further include a display driver 330 for driving the display member 310 and a touch controller 340 for driving the touch member 320.

The display member 310 may include a plurality of pixels PX, and may be driven by the display driver 330 to display an image. The display member 310 may include a plurality of data lines, a plurality of scan lines, and a plurality of pixels PX connected to the plurality of data lines and the plurality of scan lines. In an embodiment, the display member 310 may further include a plurality of light emission control lines. In an embodiment, the display member 310 may be an organic light emitting diode display panel in which each pixel PX includes an organic light emitting diode. However, the display member 310 is not limited to the organic light emitting diode display panel. Each pixel PX may include at least one thin film transistor, a storage capacitor, and an organic light emitting diode.

The display device 10 may further include a host processor (for example, a graphic processing unit (GPU)) or an application processor (AP) 400 including the GPU. The display driver 330 may drive the display member 310 based on the input image data IDAT and control signal CTRL provided from the host processor 400. In an embodiment, the input image data IDAT may be RGB data including red image data, green image data, and blue image data. Further, in an embodiment, the control signal CTRL may include, but is not limited to, an input data enable signal, a master clock signal, a vertical synchronization signal, and a horizontal synchronization signal.

The display driver 330 may generate a display panel driving signal DPS based on the input image data IDAT and the control signal CTRL, and may provide the display panel driving signal DPS to the display member 310, thereby driving the display member 310. In an embodiment, the display panel driving signal DPS may include a scan signal, a data signal, and a light emission control signal, and the display driver 330 may include a scan driver providing a scan signal to the display member 310, a data driver providing a data signal to the display member 310, a light emitting driver providing a light emission control signal to the display member 310, and a timing controller controlling the timing of the scan driver, the data driver, and the light emitting driver, but the present disclosure is not limited thereto.

The touch member 320 may include a capacitance type touch panel that senses a change in capacitance due to an external object (for example, a finger, a touch pen, a housing 200 (refer to FIG. 2). For example, the touch member 320 may include a driving line Tx and a sensing line Rx. Although it is shown in FIG. 5 that one driving line Tx and one sensing line Rx are provided, the present disclosure is not limited thereto, and a plurality of driving lines Tx and a plurality of sensing lines Rx may be provided.

The driving line Tx and the sensing line Rx may be disposed on the same layer or substantially the same layer. In such an embodiment, each of the driving line Tx and the sensing line Rx may have a structure in which a plurality of continuous polygons having a diamond shape are connected, but the present disclosure is not limited thereto. In one or more embodiments, the driving line Tx and the sensing line Rx may be disposed on different layers from each other.

The method of allowing the touch controller 340 to drive the touch member 320 may include at least one of a mutual capacitance sensing method and a self-capacitance sensing method. The touch controller 340 may perform a mutual capacitance sensing type touch sensing operation by sensing a change in mutual capacitance between the driving line Tx and the sensing line Rx. Further, the touch controller 340 may perform a self-capacitance sensing type touch sensing operation by sensing a change in the self-capacitance of the sensing line Rx (or a change in capacitance between the sensing line Rx and the external object), or may perform a self-capacitance sensing type touch sensing operation by sensing a change in the self-capacitance of the driving line Tx (or a change in capacitance between the driving line Tx and the external object).

For example, the touch controller 340 may apply a driving signal TxP to the driving line Tx. The touch controller 340 may receive a sensing signal RxP induced to the sensing line Rx by capacitive coupling between the driving line Tx to which the driving signal TxP is applied and the sensing line Rx. Alternatively, the touch controller 340 may generate touch data TD indicating whether the external object is touched and a touch position and providing the touch data TD to the host processor 400 by sensing a change in mutual capacitances between the driving line Tx to which the driving signal TxP is applied and the sensing line Rx based on the sensing signals RxP or by sensing a change in self-capacitance of the driving line Tx and/or sensing line Rx.

The display touch module 300 may further include a boundary determining member 350. The boundary determining member 350 may divide the exposed area EA and the non-exposed area CA of the display touch module 300 and detect the exposed area EA and the non-exposed area CA of the display touch module 300. In other words, the boundary determining member 350 may calculate the coordinates (or positions) of the exposure boundary EB between the exposed area EA and the non-exposed area CA. The boundary determining member 350 may calculate the coordinates (or positions) of the exposure boundary EB by sensing a difference between mutual capacitance and/or self-capacitance of the touch member 320 in the exposed area EA and the non-exposed area CA.

The boundary determining member 350 may include a sensor 351, a comparison operator 352, a data processor 353, and a memory 354.

The sensing unit 351 may detect mutual capacitance and/or self-capacitance values of the entire area of the touch member 320. The mutual capacitance and/or self-capacitance values may be different in the exposed area EA and the non-exposed area CA of the touch member 320. Details thereof will be described with reference to FIG. 6.

Figure 6:
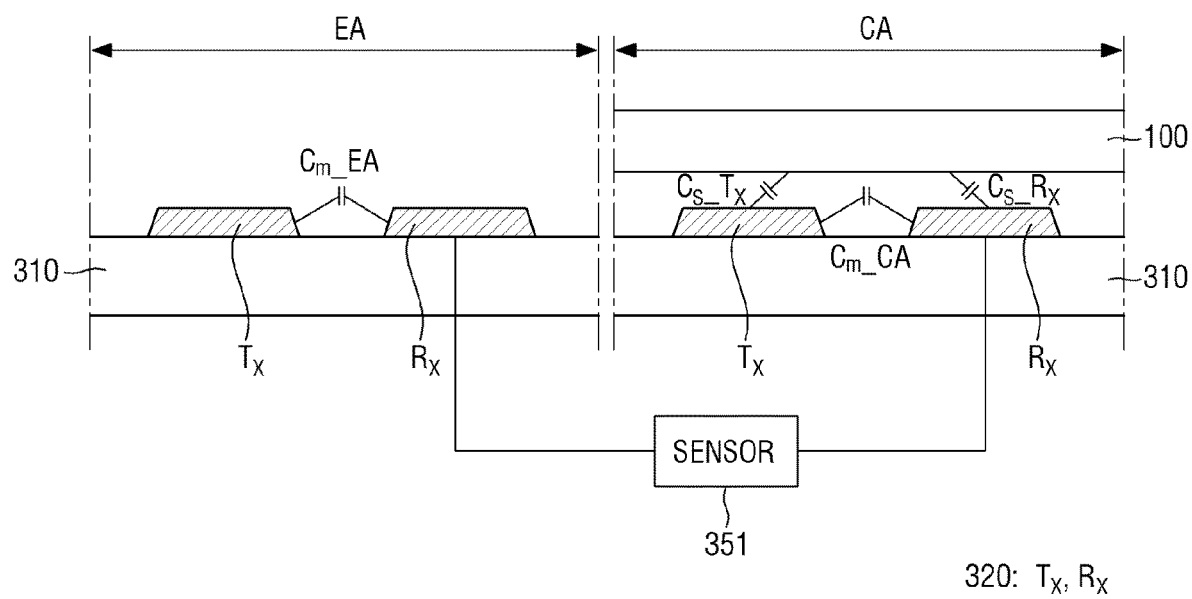
FIG. 6 is a cross-sectional view illustrating a part of an exposed area and a part of a non-exposed area in the display device.

FIG. 6 is a cross-sectional view illustrating a part of an exposed area EA and a part of a non-exposed CA area in the display device. FIG. 6 illustrates a state in which the driving line Tx and the sensing line Rx of the touch member 320 are directly disposed on the display member 310 in each of the exposed area EA and the non-exposed area CA. In the non-exposed area CA, the driving line Tx and the sensing line Rx are covered by the housing 100.

Further referring to FIG. 6, in the exposed area EA and the non-exposed area CA, the driving line Tx and the sensing line Rx may include mutual capacitance and/or self-capacitance having different values, and the sensor 351 may sense the driving line Tx and the sensing line Rx.

In other words, in the exposed area EA, the driving line Tx and the sensing line Rx may not be covered by the housing 100, and may be exposed. The driving line Tx and sensing line Rx in the exposed area EA may include mutual capacitance Cm_EA, and may not include self-capacitance.

In the non-exposed area CA, the driving line Tx and the sensing line Rx may be covered by the housing 100. The driving line Tx and sensing line Rx in the non-exposed area CA may include self-capacitances Cs_Tx and Cs_Rx as well as mutual capacitance Cm_CA. The self-capacitances Cs_Tx and Cs_Rx of the driving line Tx and sensing line Rx, respectively in the non-exposed area CA may be formed between the driving line Tx and the housing 100 and between the sensing line Rx and the housing 100, respectively. The self-capacitances Cs_Tx and Cs_Rx may be formed not only when the driving line Tx and sensing line Rx in the non-exposed area CA are in direct contact with the housing 100 but also when they are spaced apart from the housing 100 by a predetermined distance (i.e., a gap). Hereinafter, an embodiment in which the driving line Tx and sensing line Rx in the non-exposed area CA are spaced apart from the housing 100 by a predetermined distance will be described, but the present disclosure is not limited thereto.

In this embodiment, the capacitances of the driving line Tx and sensing line Rx in the exposed area EA and the non-exposed area CA may be different from each other. In other words, the exposed area EA may include only mutual capacitance Cm_EA of the driving line Tx and sensing line Rx, and the non-exposed area CA may include mutual capacitance Cm_CA and self-capacitances Cs_Tx and Cs_Rx driving line Tx and sensing line Rx. That is, the exposed area EA and the non-exposed area CA may have different capacitances from each other according to the presence or absence of the self-capacitance of the driving line Tx and sensing line Rx with the housing 100.

Further, the mutual capacitance Cm_EA of the driving line Tx and sensing line Rx in the exposed area EA may be different from the mutual capacitance Cm_CA of the driving line Tx and sensing line Rx in the non-exposed area CA. As the driving line Tx and sensing line Rx in the non-exposed area CA are adjacent to or in contact with the housing 100, the mutual capacitance Cm_CA of the non-exposed area CA may be changed or varied compared to the mutual capacitance Cm_EA in the exposed area EA. In other words, the driving line Tx and sensing line Rx in the non-exposed area CA may be influenced by an electric field or a magnetic field formed by the housing 100 adjacent to or in contact with the display touch module 300 (refer to FIGS. 1 to 4), and thus the mutual capacitance Cm_CA of the driving line Tx and sensing line Rx in the non-exposed area CA may be different from the mutual capacitance Cm_EA of the driving line Tx and sensing line Rx in the exposed area EA. That is, the driving line Tx and sensing line Rx in the exposed area EA and the non-exposed area CA may include different mutual capacitances Cm_EA and Cm_CA depending on whether or not the driving line Tx and sensing line Rx are covered by the housing 100.

The sensor 351 may be electrically connected to the sensing line Rx in the exposed area EA and the non-exposed area CA, and may sense a capacitance of the sensing line Rx in both the exposed area EA and the non-exposed area CA. Although it is illustrated in FIG. 5 that the sensor 351 is electrically connected to the sensing line Rx in both the exposed area EA and the non-exposed area CA, the present disclosure is not limited thereto, and the sensor 351 may also be electrically connected to the driving line Tx thereof.

The method of allowing the sensor 351 to sense mutual capacitances Cm_CA and Cm_EA and self-capacitances Cs_Tx and Cs_Rx of each of the exposed area EA and the non-exposed area CA is substantially the same as the aforementioned method of allowing the touch controller 340 to drive the touch member 320. In other words, the method of allowing the sensor 351 to sense mutual capacitances Cm_CA and Cm_EA and self-capacitances Cs_Tx and Cs_Rx of the exposed area EA and the non-exposed area CA may be substantially the same as the method of allowing the touch controller 340 to sense a change in mutual capacitance and self-capacitance between the driving line Tx and the sensing line Rx, but the present disclosure is not limited thereto.

Referring to FIG. 5, the comparison operator 352 may receive mutual capacitance and/or self-capacitance values of the entire area of the touch member 320 from the sensor 351. The comparison operator 352 compares each of the mutual capacitance and/or the self-capacitance values of the entire area of the touch member 320 with a pre-stored capacitor threshold value. As will be described later, a portion where the mutual capacitance and/or self-capacitance value exceeds the capacitor threshold value may be the exposure boundary EB.

The data processor 353 may receive capacitor information obtained by comparing the mutual capacitance and/or self-capacitance value of the touch member 320 with the capacitor threshold value from the comparison operator 352, and may process the capacitor information. In other words, the data processor 353 may convert the capacitor information obtained by comparing the mutual capacitance and/or the self-capacitance value of the touch member 320 with the capacitor threshold value into a format suitable for transmission. The data processor 353 may transmit the capacitor information converted by a wired or wireless communication method to the boundary calculator 354.

The boundary calculator 354 may receive the capacitor information obtained by comparing the mutual capacitance and/or self-capacitance value of the touch member 320 with the capacitor threshold value, and calculate an exposure boundary EB based on the capacitor information, and determine the exposure boundary EB. The boundary calculator 354 may transmit boundary information BDT of the exposed area EA and the non-exposed area CA to the host processor 400. However, the present disclosure is not limited thereto, and the boundary calculator 354 may transmit the boundary information BDT of the exposed area EA and the non-exposed area CA to the display driver 330.

The host processor 400 may receive the boundary information BDT and transmit a boundary signal BIDT to the display driver 330. The boundary signal BIDT may include information about the boundary (exposure boundary EB) between the exposed area EA and the non-exposed area CA of the display touch module 300 and a command to display a screen (static and/or dynamic images) only in the exposed area EA at one side of the boundary (exposure boundary EB). The display driver 330 receiving the boundary signal BIDT may display the screen only in the exposed area EA of the display member 310. However, the present disclosure is not limited thereto. When the display driver 330 directly receives boundary information BDT of the exposed area EA and the non-exposed area CA, the display driver 330 may directly transmit a signal to display the screen only in the exposed area EA at one side of the boundary (exposure boundary EB).

The memory 355 may store information obtained by comparing mutual capacitance and/or self-capacitance values of the entire area of the touch member 320 with a previously stored capacitor threshold and/or store coordinates (or positions) of the exposure boundary EB calculated by the boundary calculator 354. The memory unit 355 may include at least one of an internal memory and an external memory in which the information may be stored.

Although it is illustrated in FIG. 5 that the boundary determining member 350 is a separate component from the display driver 330 and the touch controller 340, the present disclosure is not limited thereto. For example, in some other embodiments, the boundary determining member 350 may be provided together with the touch controller 340 (e.g., the boundary determining member 350 and the touch controller 340 may be an integral component). In other words, the touch controller 340 may include the boundary determining member 350. Alternatively, in some other embodiments, some of the components of the boundary determining member 350 may be provided together with the touch controller 340, and other components thereof may be provided together with the host processor 400 (or display driver 330). For example, the sensor 351, comparison operator 352, and data processor 353 of the boundary determining member 350 may be provided together with the touch controller 340, and the boundary calculator 354 thereof may be provided together with the host processor 400 (or the display driver 330).

Hereinafter, an operation in which the display touch module 300 calculates the exposure boundary EB between the exposed area EA and the non-exposed area CA will be described in detail.

Figure 7:
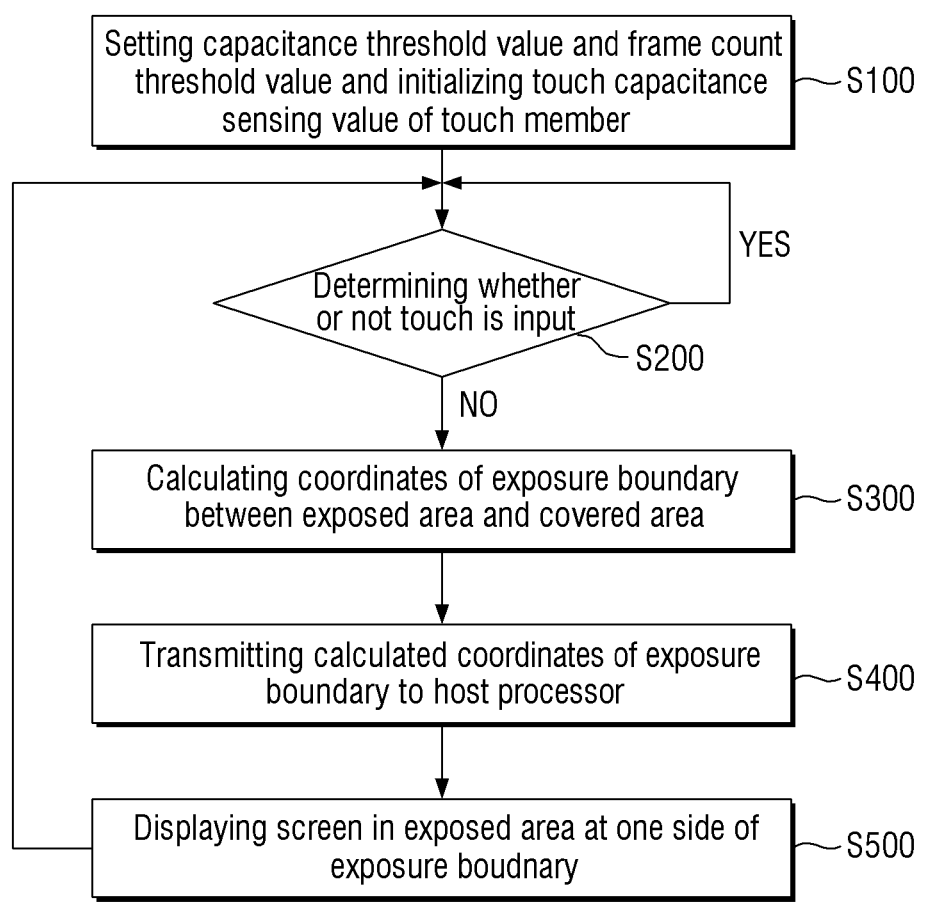
FIGS. 7 and 8 are flowcharts illustrating a method of driving a display device according to an embodiment of the present disclosure.
Figure 8:
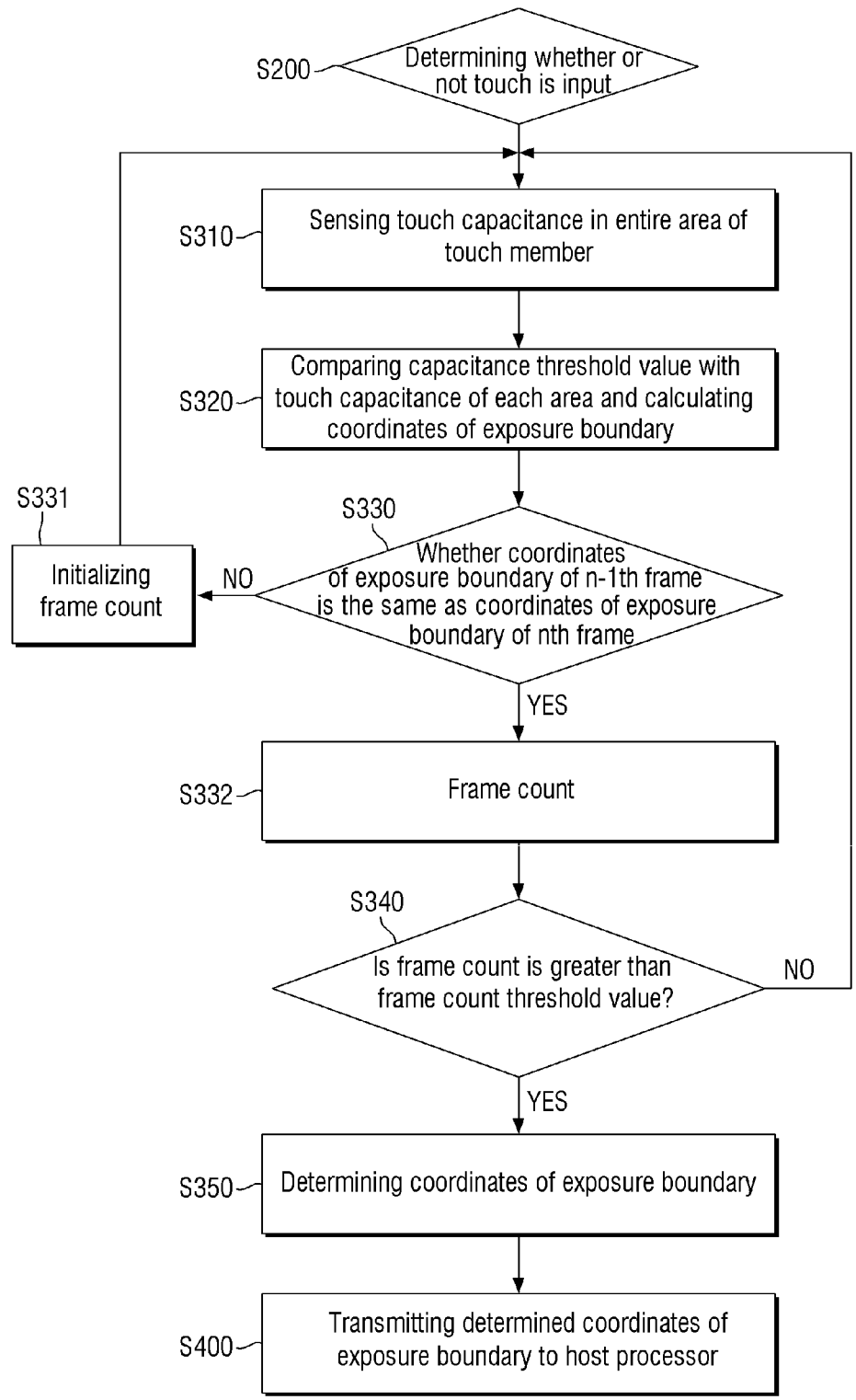

FIGS. 7 and 8 are flowcharts illustrating a method of driving a display device according to an embodiment.

Referring to FIGS. 5, 7, and 8, a capacitance threshold value THC (see FIG. 9) and a frame count threshold value (not shown) are set, and a touch capacitance value sensed in each area of the touch member 320 is initialized (S100). Hereinafter, the touch capacitance of the touch member 320 is used as a term including both mutual capacitances Cs_Tx and Cs_Rx (refer to FIG. 6) and self-capacitances Cm_CA and Cm_EA (refer to FIG. 6) of the touch member 320.

Subsequently, it is determined whether the touch member 320 is touched (S200). In the method of determining whether the touch member 320 is touched, mutual capacitance and/or self-capacitance is sensed in the touch member 320 of the active area AAR and is compared with a threshold value that is a criterion for determining whether the touch member 320 is touched. In this embodiment, when the mutual capacitance and/or self-capacitance is greater than the threshold value, it may be determined that the touch member 320 has been touched.

Alternatively, mutual capacitance and/or self-capacitance is sensed in the touch member 320 of the active area AAR, it is determined whether an area having mutual capacitance and/or self-capacitance greater than a threshold value that is a criterion for determining whether the touch member 320 is touched, thereby accurately determining whether the touch member 320 is touched. For example, when an area having mutual capacitance and/or self-capacitance greater than a threshold value that is a criterion for determining whether the touch member 320 is touched is less than ½ of the width of the active area AAR of the touch member 320 in the second direction DR2 and/or the first direction DR1, is less than 1/10 of the width thereof, or is less than 1/20 of the width thereof, it may be determined that the touch member is touched in the corresponding area.

Since the method of sensing mutual capacitance and self-capacitance of the touch member 320 has been described as above, a description thereof will be omitted.

When it is determined that the touch member 320 is touched, it is determined whether the touch member 320 is touched again (S200). When it is determined that the touch member 320 is not touched, the coordinates of the exposure boundary EB are calculated (S300).

In one embodiment, first, a touch capacitance is sensed over the entire area of the touch member 320 (S310). In other words, mutual capacitance and self-capacitance are sensed over the entire area of the touch member 320 in the active area AAR. In this embodiment, since there is no touch input in the touch member 320, the touch member 320 may be influenced only by the interference of the housing 100, and thus only different mutual capacitances Cs_Tx and Cs_Rx (refer to FIG. 6) and different self-capacitances Cm_CA and Cm_EA (refer to FIG. 6) may be sensed in each of the exposed area EA and non-exposed area CA. The mutual capacitances Cs_Tx and Cs_Rx (refer to FIG. 6) and the self-capacitances Cm_CA and Cm_EA (refer to FIG. 6) may be sensed by the sensor 351, but the present disclosure is not limited thereto.

Subsequently, each of the mutual capacitances Cs_Tx and Cs_Rx (refer to FIG. 6) and the self-capacitances Cm_CA and Cm_EA (refer to FIG. 6) is compared with a capacitance threshold value THC, and the coordinates of the exposure boundary EB are calculated according to the comparison result (S320). An operation of calculating the coordinates of the exposure boundary EB will be described in more detail with further reference to FIG. 9.

Figure 9:
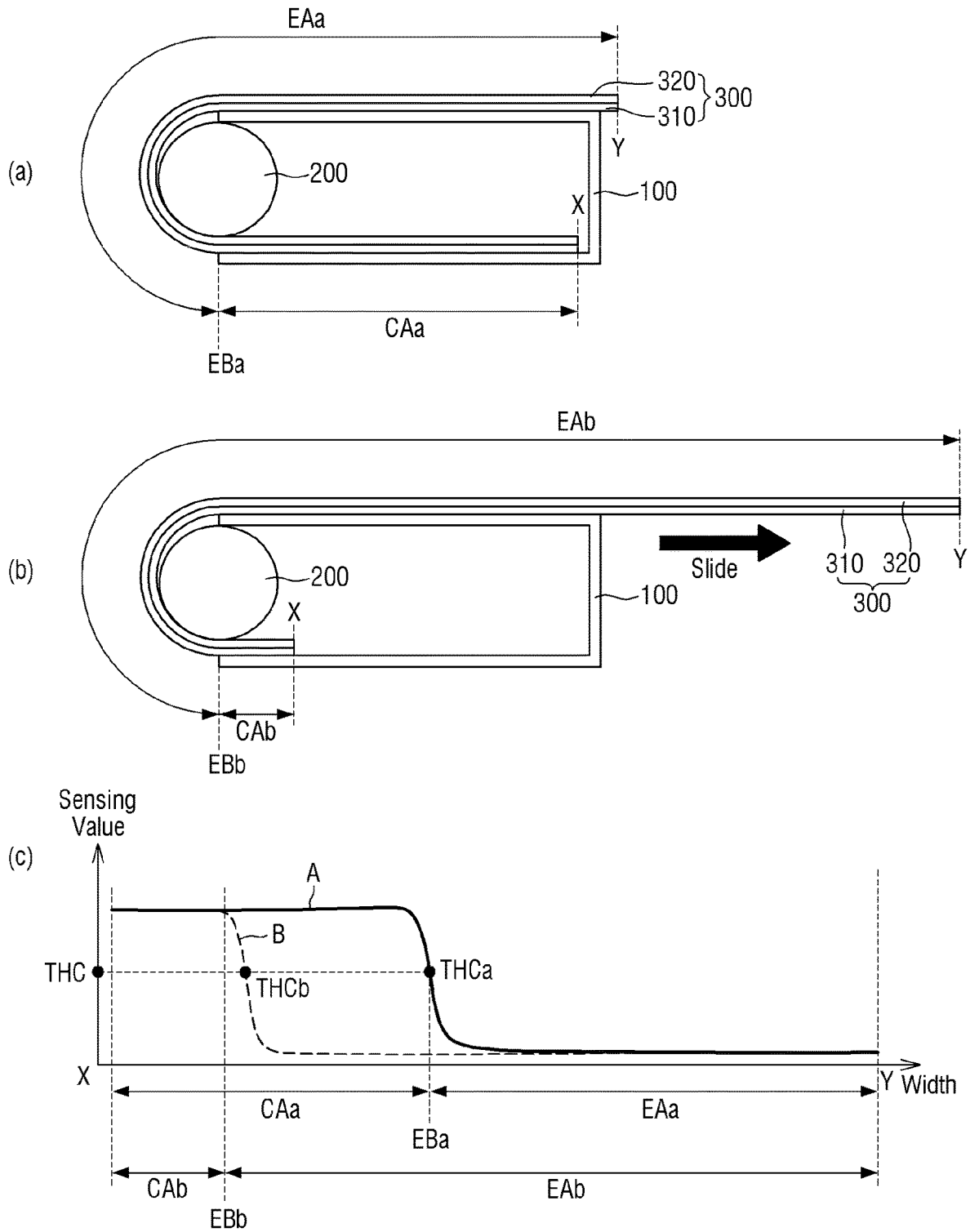
FIG. 9 illustrates views for explaining a method of calculating an exposure boundary of a display touch module of a display device according to an embodiment of the present disclosure.

FIG. 9 illustrates views for explaining a method of calculating the exposure boundary EB of the display touch module 300 of a display device according to an embodiment. In FIG. 9, (a) illustrates a state of the display device 10 before sliding, (b) illustrates a state of the display device 10 after sliding, and (c) is a graph illustrating a capacitance value for each position (state (a) and state (b)) of the touch member 320. Further, in FIG. 9, the horizontal axis of (c) represents a width from one end (X) to the other end (Y) of the display touch module 300 in a cross-sectional view, and the vertical axis of (c) represents a sensing value of any one of mutual capacitances Cs_Tx and Cs_Rx (refer to FIG. 6) and self-capacitances Cm_CA and Cm_EA (refer to FIG. 6).

In FIG. 9, (c) represents a sensing value of any one of mutual capacitances Cs_Tx and Cs_Rx (refer to FIG. 6) and self-capacitances Cm_CA and Cm_EA (refer to FIG. 6) at each point from one end X to the other end Y of the display touch module 300. In (c) of FIG. 9, graph line A (solid) represents a sensing value for the state (a), and graph line B (dashed) represents a sensing value for the state (b). Further, in (c) of FIG. 9, a capacitance threshold value THC is represented.

Further referring to FIG. 9, the sensing value at the exposure boundary EB may be substantially equal to the capacitance threshold value THC, the area disposed at one side of the exposure boundary EB (e.g., the non-exposed area CA) may include a sensing value greater than the capacitance threshold value THC, and the area disposed at the other side of the exposure boundary EB (e.g., the exposed area EA) may include a sensing value less than the capacitance threshold value THC. For example, the non-exposed areas CAa and CAb may include sensing values greater than the capacitance threshold value THC, the exposed areas EAa and EAb may include sensing values less than the capacitance threshold value THC, and the exposure boundary EB may include a sensing value substantially equal to the capacitance threshold value THC.

Further, the sensing value may be continuous across the capacitance threshold value THC between the areas (non-exposed areas CAa, CAb) disposed at one side of (e.g., above) the exposure boundary EB and the areas (exposed areas EAa, EAb) disposed at the other side of (e.g., below) the exposure boundary EB, and may pass the capacitance threshold value THC at the exposure boundary EB. However, the present disclosure is not limited thereto, and the non-exposed areas CAa and CAb may include a sensing value smaller than the capacitance threshold THC, and the exposed areas EAa and EAb may include a sensing value larger than the capacitance threshold THC.

In the touch member 320, any one of mutual capacitances Cs_Tx and Cs_Rx (refer to FIG. 6) and self-capacitances Cm_CA and Cm_EA (refer to FIG. 6) in each region from one end X to the other end Y of the display touch module 300 may be sensed, and may be compared with a pre-stored capacitance threshold value THC. The sensing values measured in each region may be substantially the same as each other in the second direction DR2 (see FIGS. 1-4), but the present disclosure is not limited thereto. Further, the capacitance threshold values THC may be different from each other in the case where the sensing targets are mutual capacitances Cs_Tx and Cs_Rx (refer to FIG. 6) and in the case where the sensing targets are self-capacitances Cm_CA and Cm_EA (refer to FIG. 6), but the present disclosure is not limited thereto.

As the display touch module 300 slides, the coordinates of the exposure boundaries EBa and EBb may be changed. For example, as shown in (a) and (b) of FIG. 9, as the display touch module 300 slides, the exposed areas EAa and EAb may expand and the non-exposed areas CAa and Cab may contract. In this embodiment, as the display touch module 300 slides, the exposure boundary EBa shown in state (a) before sliding may move to or toward one end X, and may be located at the exposure boundary EBb shown in state (b) after sliding.

Even when the coordinates of the exposure boundaries EBa and EBb change as the display module 300 slides, as described above, coordinates of the exposure boundaries EBa and EBb may be calculated through the capacitance threshold values THCa and THCb. In other words, in (c) of FIG. 9, the capacitance threshold value (THCa) of graph line A and the capacitance threshold value (THCb) of graph line B are substantially the same as each other, and even when the coordinates (or positions) of the exposure boundaries EBa and EBb are changed by the sliding of the display touch module 300, the coordinates of the exposure boundaries EBa and EBb may be calculated by sensing the capacitance threshold values THCa and THCb.

Subsequently, as illustrated in FIG. 8, it is determined whether the coordinates of the exposure boundary EB calculated in a current frame and the coordinates of the exposure boundary EB calculated in a previous frame are the same as each other (S330). The coordinates of the exposure boundary EB calculated for each frame may be compared with each other, thereby detecting whether the touch display module 300 slides.

In one or more embodiments, the operation of calculating the coordinates of the exposure boundary EB may be performed for each frame. For example, the touch controller 340 may drive the touch member 320 at a frame rate of 120 Hz. In this embodiment, the coordinates of the exposure boundary EB may be calculated for each frame, and thus the exposure boundary EB may be calculated 120 times per second, but the present disclosure is not limited thereto. The frame rate is not limited thereto, and the number of times the coordinates of the exposure boundary EB are calculated may be different from the frame rate.

The current frame may be referred to as the nth frame, and in this embodiment, the previous frame may be referred to as the n−1th frame (where n is a natural number). In task S330, the coordinates of the exposure boundary EB calculated in the nth frame are compared with the coordinates of the exposure boundary EB calculated in the n−1th frame.

When the coordinates of the exposure boundary EB calculated in the nth frame are different from the coordinates of the exposure boundary EB calculated in the n−1th frame, a frame count is initialized (S331). When the frame count is initialized, the frame count may be '0', but is not limited thereto. After initializing the frame count, the process returns to step S310 of sensing the touch capacitance of the touch member 320 again.

When the coordinates of the exposure boundary EB calculated in the nth frame are substantially the same as the coordinates of the exposure boundary EB calculated in the n-1th frame, the frame count is increased (S332). For example, 1 may be added to the current frame count, but the present disclosure is not limited thereto.

Subsequently, the frame count is compared with a frame count threshold value (S340).

When the frame count is less than the frame count threshold value, the process returns to step S310 of sensing the touch capacitance of the touch member 320 again. When the frame count is less than the frame count threshold, it can be seen that the calculated exposure boundary EB has not been maintained for a certain period of time (e.g., a threshold period of time). In other words, it can be seen that the display touch module 300 is sliding, and expansion or contraction of the exposed area EA is in progress. In this case, the previously determined exposure boundary EB is maintained, and a screen may be displayed only in the exposure area EA based on this state (i.e., the previous state when the display touch module 300 was not sliding).

When the frame count is greater than the frame count threshold value, the currently calculated coordinates of the exposure boundary EB are determined (S350). When the frame count is greater than the frame count threshold value, it can be seen that the calculated exposure boundary EB has been maintained for a predetermined time. In other words, when the frame count is equal to or greater than the frame count threshold value, it is determined that the display touch module 300 is not sliding, and the expansion or contraction of the exposed area EA has stopped. In this case, a new exposure boundary EB having coordinates different from those of the initial exposure boundary EB may be determined.

The frame count of the calculated coordinates of the exposure boundary EB may be calculated and compared with the frame count threshold value, thereby determining whether or not the display touch module 300 is sliding. Accordingly, the calculated coordinates of the exposure boundary EB may be determined. For example, the frame rate of the touch controller 340 may be 120 Hz, the coordinates of the exposure boundary EB may be calculated for each frame, the initial value of the frame count may be '0', and the frame count threshold may be 120. In this case, if the frame count is equal to or greater than the frame count threshold value (i.e., 120), it can be seen that the exposure boundary EB has been maintained for 1 second or more, and it can be recognized that the sliding of the display touch module 300 by the user has stopped. However, the present disclosure is not limited thereto, and the time to recognize that the sliding has stopped may vary according to the frame rate and the frame count threshold value.

Subsequently, the determined coordinates of the exposure boundary EB are transmitted to the host processor 400 (S400). However, the present disclosure is not limited thereto, and the determined coordinates of the exposure boundary EB may be transmitted to the display driver 330.

Subsequently, the host processor 400 displays a screen only in the exposed area EA based on the coordinates of the exposure boundary EB (S500). In other words, the host processor 400 may transmit a signal to the display driver 330 such that a screen is displayed only in the exposed area EA, which is located at one side of the exposure boundary EB. According to the signal, the display driver 330 may display a screen only in the exposed area EA.

Even when the active area AAR is disposed across the exposed area EA, the unexposed area CA, and the exposed boundary EB, the non-exposed area CA is covered by the housing 100, and thus the user may not be able to recognize or view images displayed in the non-exposed area CA. Since the touch capacitor of the touch member 320 may be sensed to calculate and determine the exposure boundary EB, a screen (static and/or dynamic images) may be displayed in the exposed area EA of the active area AAR, and may not be displayed in the non-exposed area CA of the active area AAR.

Accordingly, since a screen (static and/or dynamic images) may be displayed only in the exposed area EA of the active area AAR, which is visible to the user, unnecessary power consumption of the display device 10 may be reduced. Further, since the exposed area EA, the non-exposed area CA, and the exposed boundary EB are calculated through the touch member 320, a separate configuration is unnecessary, it is possible to suppress or prevent a decrease in process efficiency of forming the display device 10, and it is possible to suppress or prevent an increase in process cost.

Figure 10:
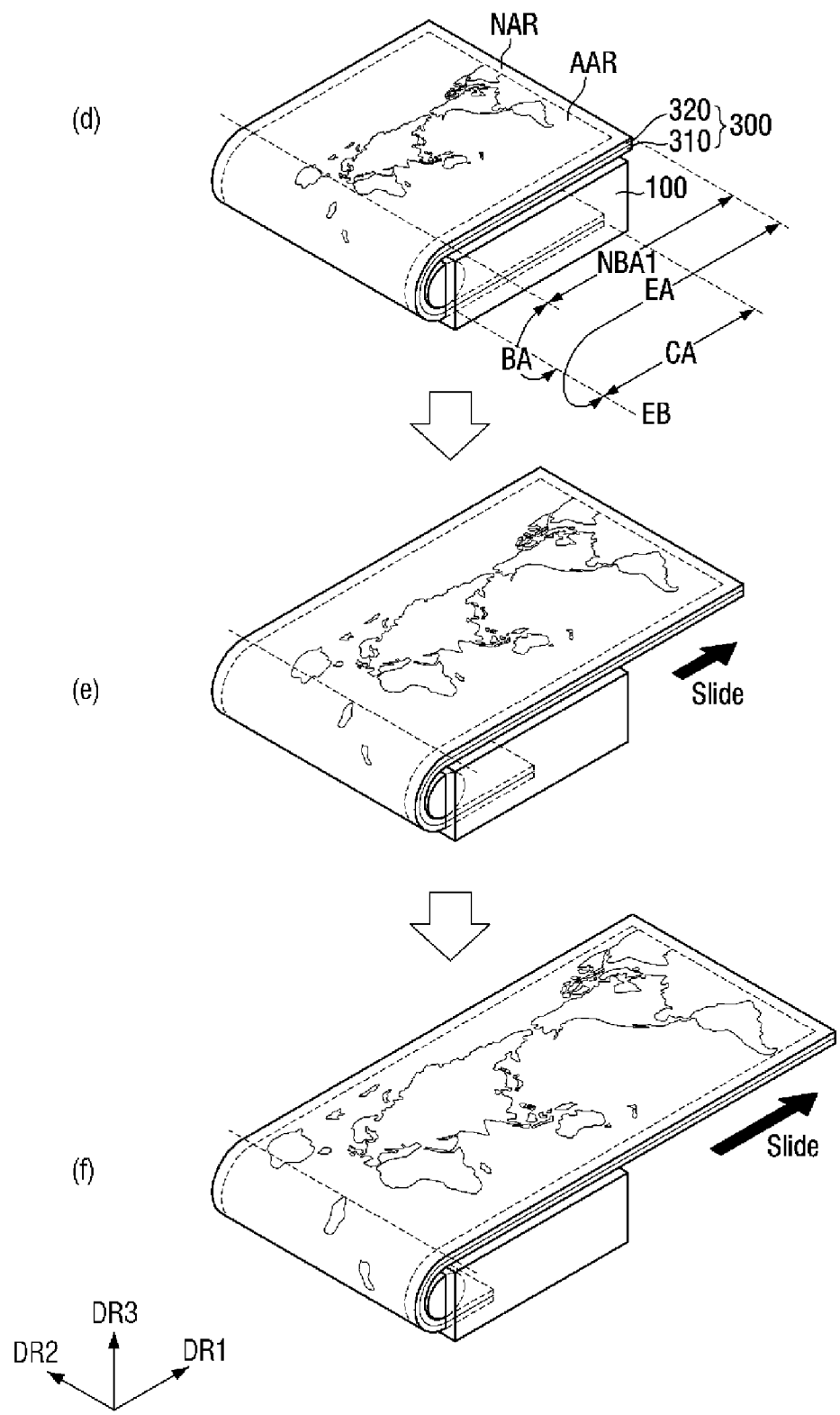
FIGS. 10 and 11 are views illustrating a state in which a display device according to an embodiment of the present disclosure is driven as a display touch module slides.
Figure 11:
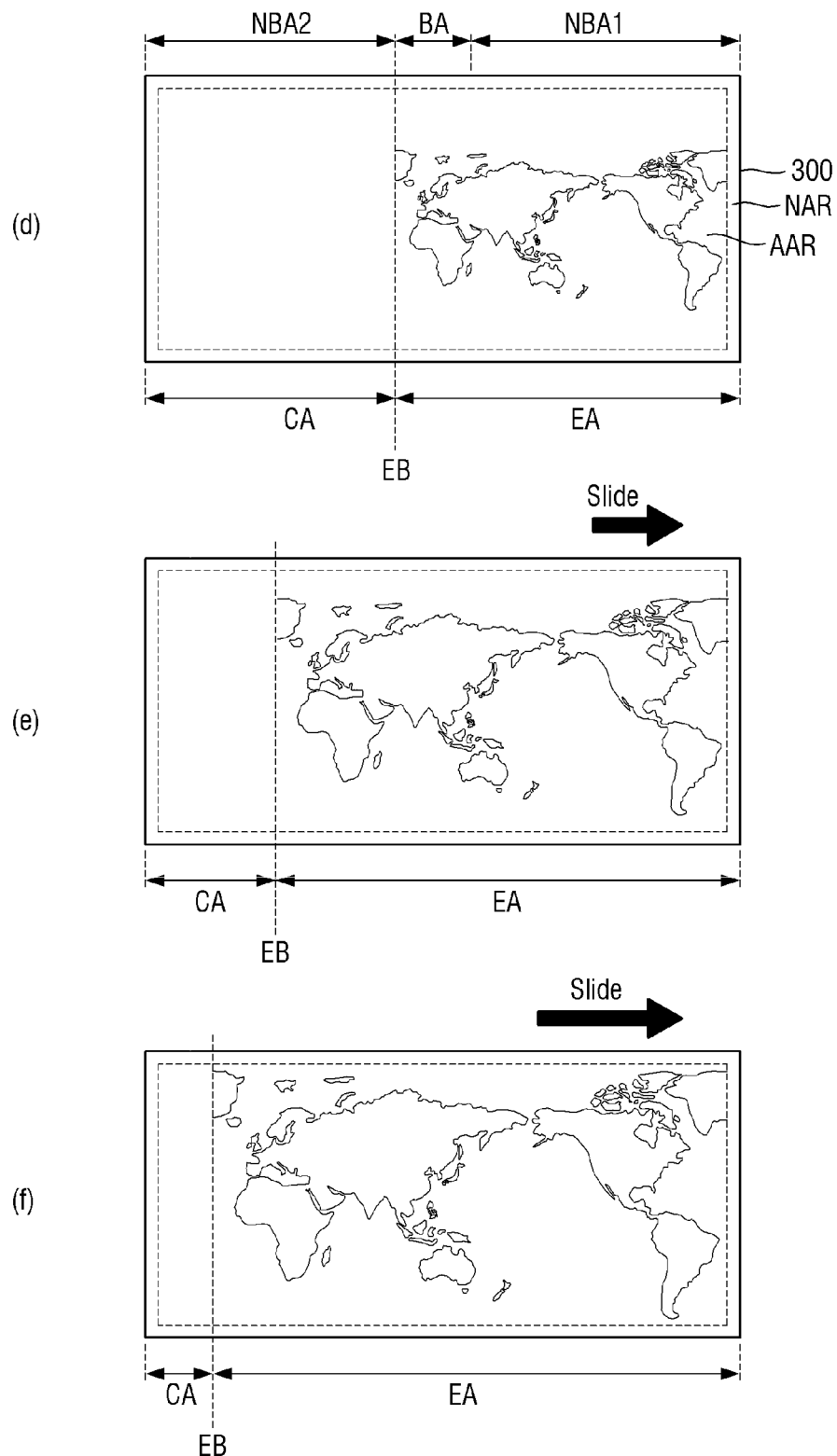

FIGS. 10 and 11 are views illustrating a state in which the display device 10 according to an embodiment is driven as a display touch module 300 slides. In FIG. 10, (d), (e), and (f) show perspective views of the display device 10, and illustrate screens (visual displays) varying as the display touch module 300 gradually slides. In FIG. 11, (d'), (e'), and (f') show plan views of the display touch module 300 shown in (d), (e), and (f) of FIG. 10, respectively, and illustrate a state in which the display touch module 300 is in an unfolded configuration, for convenience of explanation. Moreover, for convenience of explanation, in FIG. 10, the guide roller 200 (refer to FIGS. 2 and 4) is omitted.

Referring to FIGS. 10 and 11, as the display touch module 300 slides, the exposure area EA may be expanded (increased or elongated). The exposed area EA may include the first non-bending area NBA1 and at least a part of the bending area BA, and an image may be displayed over the first non-bending area NBA1 and the bending area BA.

As the exposed area EA is expanded, an area in which a screen can be viewed by a user may be expanded. When the display touch module 300 slides to expand the exposure area EA, an image on the screen displayed in the exposed area EA of the active area AAR may be gradually expanded. In other words, in each of (d), (e), and (f), the display device 10 displays the same image(s), but the size(s) of the image(s) may be different from each other. The image on the screen displayed in (e) may be larger than the image on the screen displayed in (d), and the image on the screen displayed in (f) may be larger than the image on the screen displayed in (e).

However, the present disclosure is not limited thereto. When the display touch module 300 slides to contract the exposure area EA, an image on the screen displayed in the exposed area EA of the active area AAR may be gradually contracted.

Hereinafter, other embodiments will be described. In the following embodiments, for the same components as those previously described, redundant descriptions will be omitted or simplified, and the differences will be mainly described.

Figure 12:
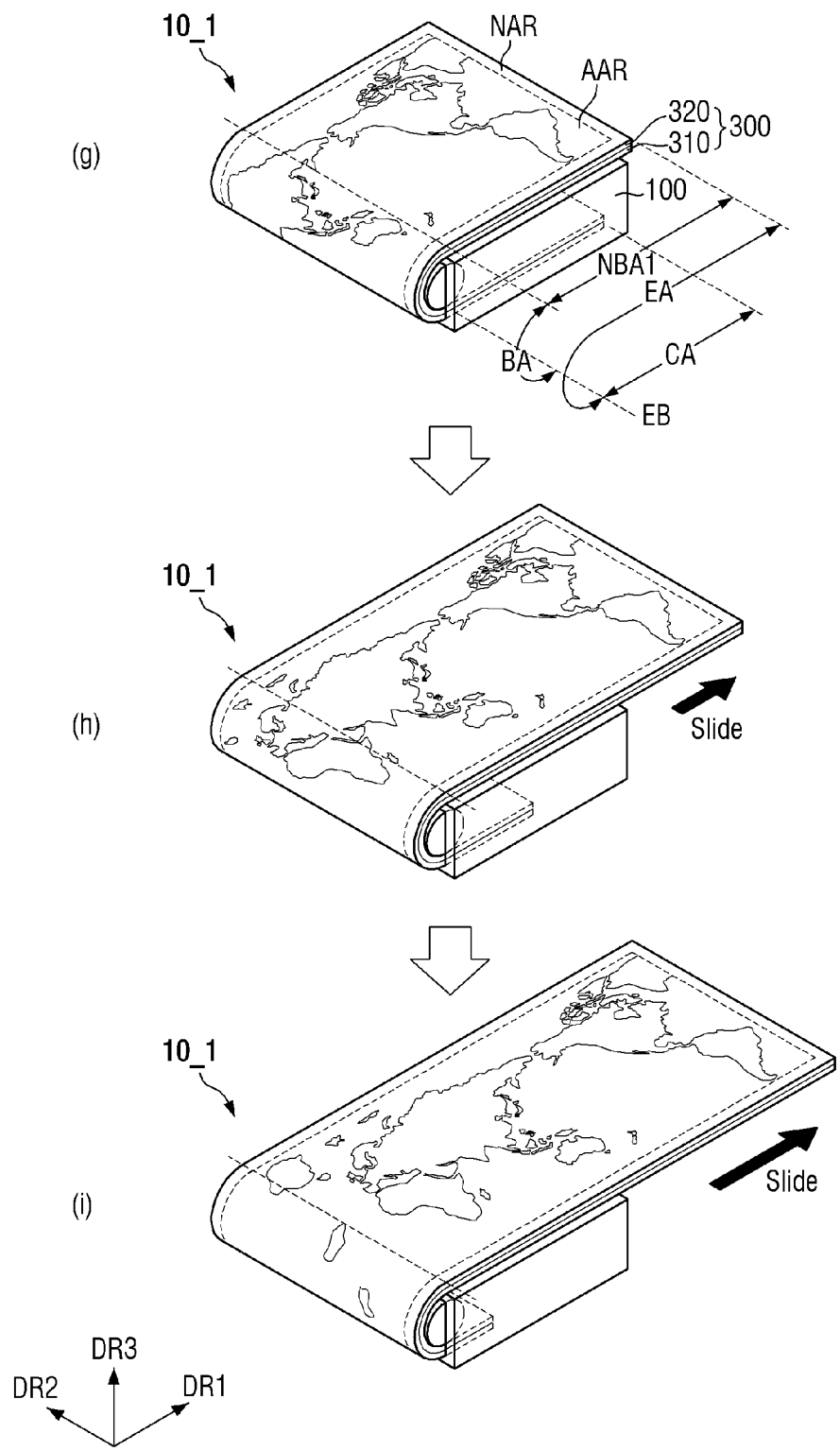
FIGS. 12 and 13 are views illustrating a state in which a display device according to another embodiment of the present disclosure is driven as a display touch module slides.
Figure 13:
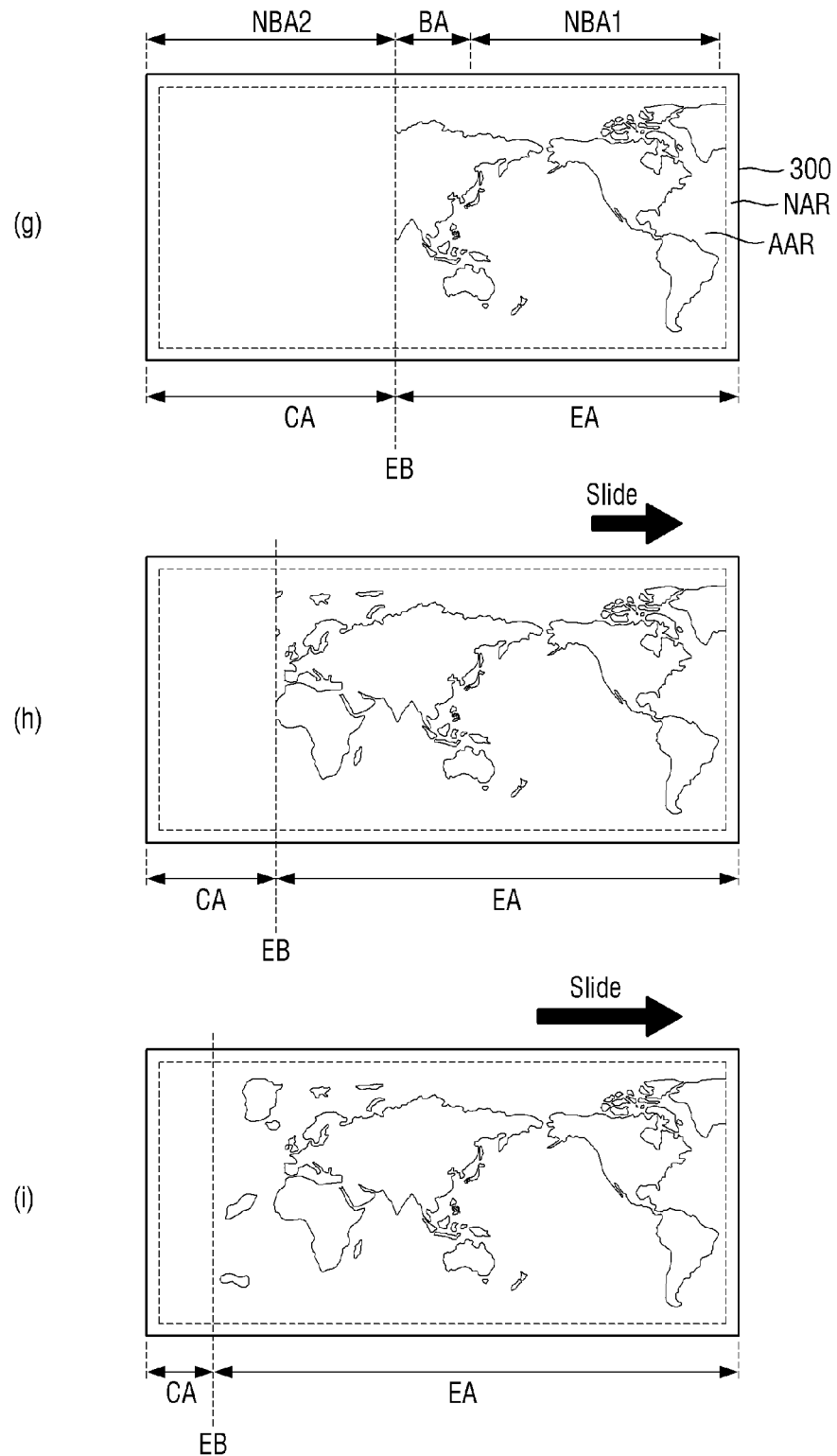

FIGS. 12 and 13 are views illustrating a state in which a display device according to another embodiment is driven as a display touch module slides. In FIG. 12, (g), (h), and (i) show perspective views of a display device 10_1, and illustrate screens varying as the display touch module 300 gradually slides. In FIG. 13, (g'), (h'), and (i') show plan views of the display touch module 300 shown in (d), (e), and (f) of FIG. 10, respectively, and illustrate a state in which the display touch module 300 is in an unfolded configuration, for convenience of explanation.

Referring to FIGS. 12 and 13, the present embodiment is different from the embodiment of FIGS. 10 and 11 in that an operation of a screen (static or dynamic images) displayed by the display touch module 300 of the display device 10_1 according to the present embodiment is different from the operation of the screen (static or dynamic images) displayed by the display touch module 300 of the display device 10 of the embodiment of FIGS. 10 and 11.

In the embodiment illustrated in FIGS. 12 and 13, as the display touch module 300 slides, the exposure area EA may be expanded. As the exposed area EA is expanded, an area in which a screen can be viewed by a user may be expanded. When the display touch module 300 slides to expand the exposure area EA, a larger number of portions of an image on the screen displayed in the exposed area EA of the active area AAR may be gradually displayed. For example, an image on the screen displayed in (g) may correspond to ½ of the entire image, an image on the screen displayed in (h) may correspond to ¾ of the entire image, and an image on the screen displayed in (i) may correspond to the entire image.

Even in this embodiment, the screen may not be displayed in the non-exposed area CA of the active area AAR by sensing a capacitance of the touch member 320, calculating the exposure boundary EB, and determining the exposure boundary EB. Accordingly, unnecessary power consumption of the display device 10_1 may be reduced compared to an embodiment in which an image is displayed in the non-exposed area CA. In addition, as the display touch module 300 slides, various screen driving methods may be provided in the expanded exposure area CA, and user convenience may be increased.

Figure 14:
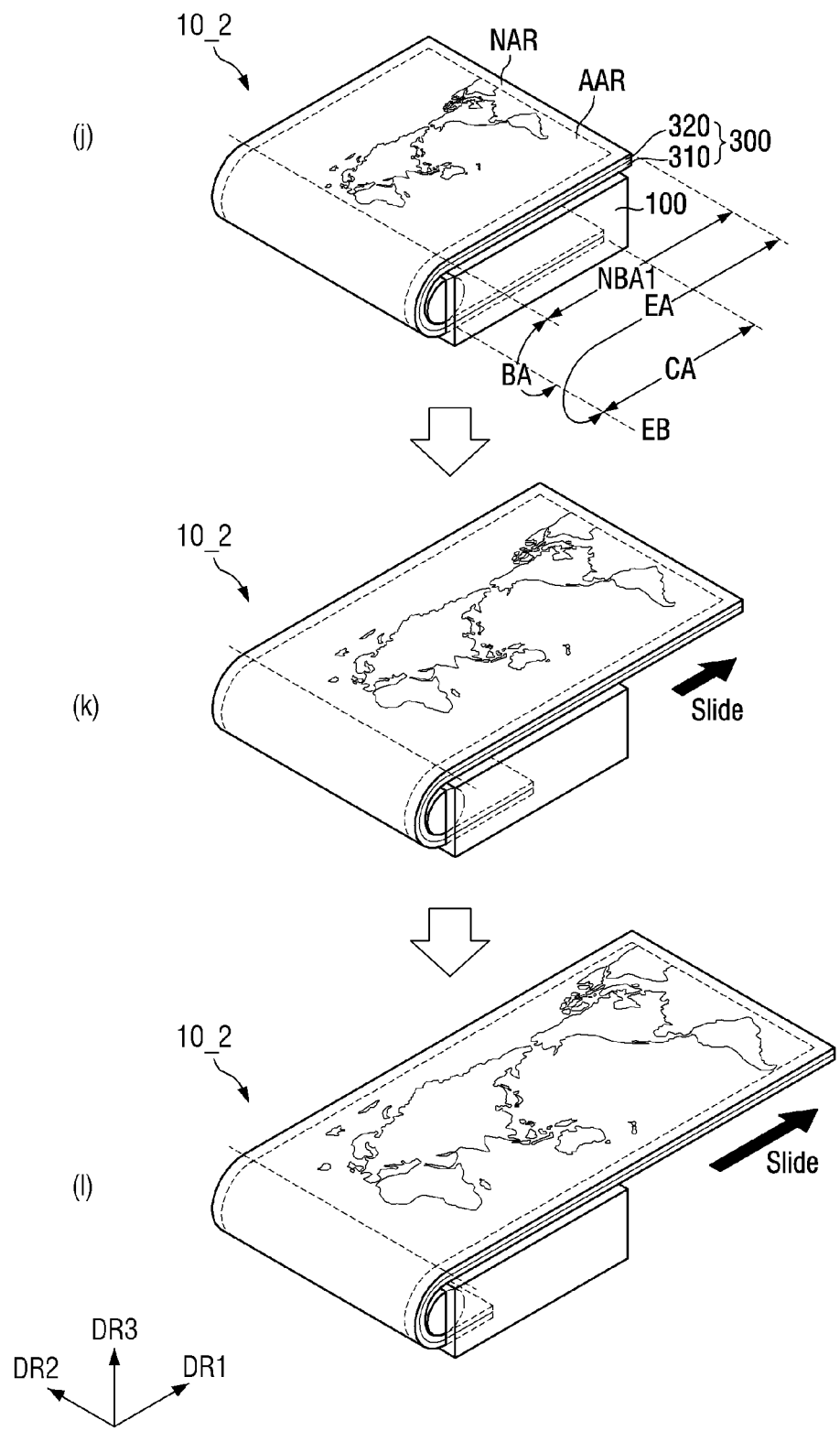
FIG. 14 shows views illustrating a state in which a display device according to still another embodiment of the present disclosure is driven as a display touch module slides.

FIG. 14 shows views illustrating a state in which a display device according to still another embodiment is driven as a display touch module slides. In FIG. 14, (j), (k), and (l) show perspective views of a display device 10_2, and illustrate screens (static and/or dynamic images) varying as the display touch module 300 gradually slides.

Referring to FIG. 14, the present embodiment is different from the embodiment of FIG. 10 in that a screen (static or dynamic images) may not be displayed in the bending area BA of the display touch module 300 of the display device 10_2 according to the present embodiment.

In the embodiment illustrated in FIG. 14, as the display touch module 300 according to the present embodiment slides, the exposure area EA may be expanded. As the exposed area EA is expanded, an area in which a screen can be viewed by a user may be expanded. When the display touch module 300 slides to expand the exposure area EA, an image on the screen displayed in the exposed area EA of the active area AAR may be gradually expanded. In other words, in (j), (k), and (l), the display device 10_2 displays the same image or images, but the sizes thereof may be different from each other. The image on the screen displayed in (k) may be larger than the image on the screen displayed in (j), and the image on the screen displayed in (l) may be larger than the screen displayed in (k).

A screen (static and/or dynamic images) may be displayed in the first non-bending area NBA1 of the display touch module 300, and may not be displayed in the bending area BA thereof. Even when the display touch module 300 slides, a curvature and a radius of curvature of the bending area BA of the display touch module 300 may be constant. Accordingly, the distance (or the number of pixels) from the exposure boundary EB to the boundary between the bending area BA and the first non-bending area NBA1 may be measured or determined, and the measured or determined distance may be reflected on the coordinates of the determined exposure boundary EB, thereby allowing the screen to be displayed only in the first non-bending area NBA1 without being displayed in the bending area BA.

Even in this embodiment, the screen may not be displayed in the non-exposed area CA of the active area AAR by sensing a capacitance of the touch member 320, calculating the exposure boundary EB, and determining the exposure boundary EB. Accordingly, unnecessary power consumption of the display device 10_2 may be reduced compared to an embodiment in which an image is displayed in the non-exposed area CA. In addition, as the display touch module 300 slides, various screen driving methods may be provided in the expanded exposure area CA, and user convenience may be increased.

Figure 15:
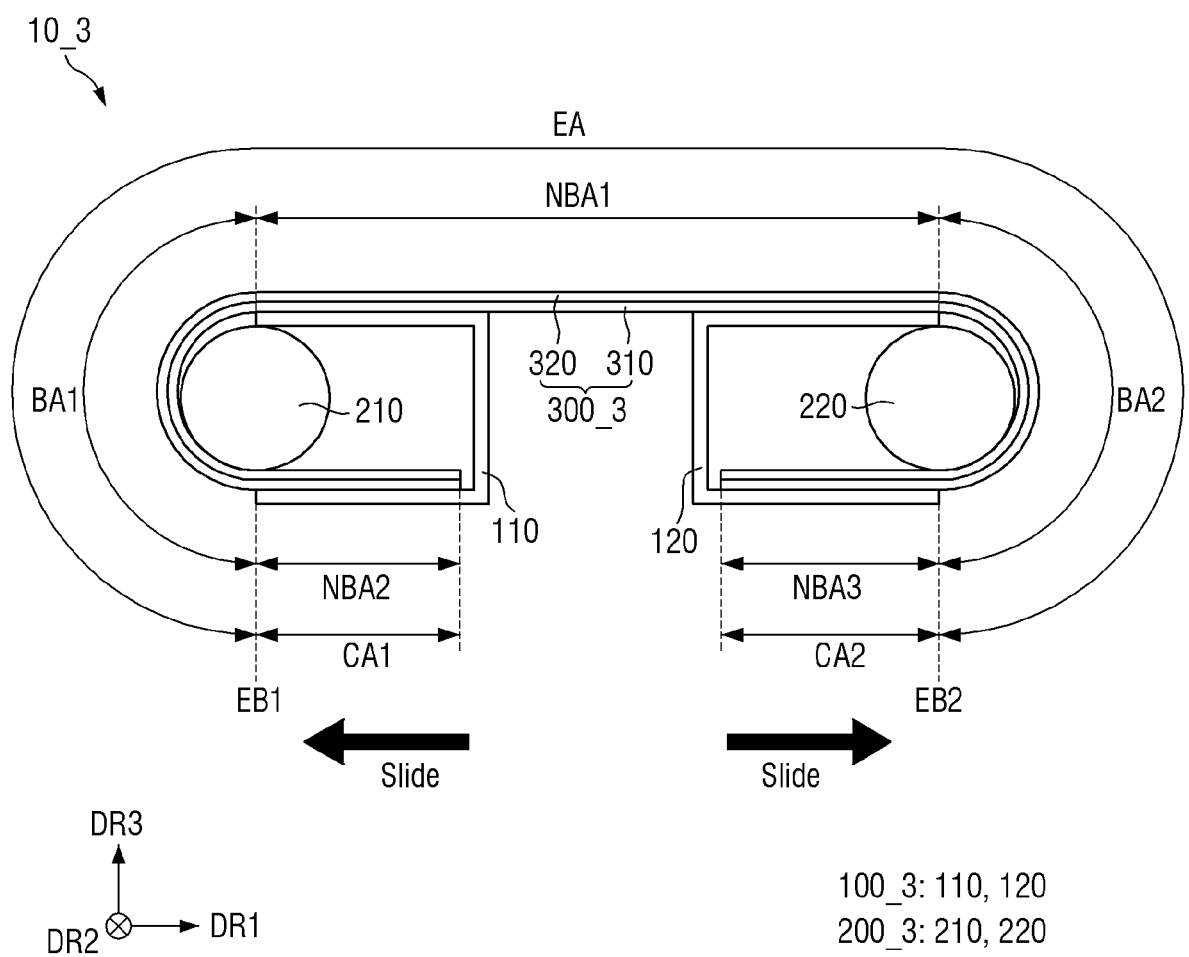
FIG. 15 is a cross-sectional view of a display device according to still another embodiment of the present disclosure.

FIG. 15 is a cross-sectional view of a display device according to still another embodiment.

Referring to FIG. 15, a display touch module 300_3 of a display device 10_3 according to the present embodiment is different from that of the embodiment of FIG. 2 in that it may slide toward one side and the other side in the first direction DR1 (e.g., the display touch module 300_3 may slide in both the positive third direction (+DR3) and the negative third direction (−DR3)).

In the embodiment illustrated in FIG. 15, a housing 100_3 of the display device 10_3 according to the present embodiment includes a first housing 120 and a second housing 120, and a guide roller 200_3 thereof may include a first guide roller 210 and a second guide roller 220. The first housing 120 and the second housing 120 may be separated and spaced apart from each other, but the present disclosure is not limited thereto.

The display touch module 300_3 of the display device 10_3 according to the present embodiment may include a first bending area BA1, a second bending area BA2, a first non-bending area NBA1, a second non-bending area NBA2, and a third non-bending area NBA3.

The second non-bending area NBA2 may be disposed at one side of the first non-bending area NBA1, and the third non-bending area NBA3 may be disposed at the other side thereof (i.e., second and third non-bending areas NBA2 and NBA3 may be located at opposite sides or ends of the first non-bending area NBA1). The first bending area BA1 may be disposed between the first non-bending area NBA1 and the second non-bending area NBA2, and the second bending area BA2 may be disposed between the first non-bending area NBA1 and the third non-bending area NBA3.

The display touch module 300_3 may include an exposed area EA, a first non-exposed area CA1, a second non-exposed area CA2, a first exposure boundary EB1, and a second exposure boundary EB2. The first exposure boundary EB1 may be located between the exposed area EA and the first non-exposed area CA1, and the second exposure boundary EB2 may be located between the exposed area EA and the second non-exposed area CA2.

The exposed area EA may include the first non-bending area NBA1, the first bending area BA1, and the second bending area BA2. The first non-exposed area CA1 may include a second non-bending area NBA2, and the second non-exposed area CA2 may include a third non-bending area NBA3, but the present disclosure is not limited thereto.

The display touch module 300_3 may slide toward one side and the other side (i.e., in opposite directions) in the first direction DR1, and the exposed area EA may be expanded by the sliding. The exposed area EA may be expanded to at least one of one side and the other side in the first direction DR1. In other words, according to the sliding direction of the display touch module 300_3, the exposed area EA may be expanded along one side in the first direction DR1 (e.g., +DR3), may be expanded along the other side in the first direction DR1 (e.g., −DR3), or may be expanded along both sides in the first direction DR1 (e.g., +DR3 and −DR3).

Even in this embodiment, a screen may not be displayed in the non-exposed area CA of the active area AAR by sensing a capacitance of the touch member 320, calculating the exposure boundaries EB1 and EB2, and determining the exposure boundaries EB1 and EB2. Accordingly, unnecessary power consumption of the display device 10_3 may be reduced compared to an embodiment in which an image is displayed in the non-exposed areas CA1 and/or CA2. In addition, as the display touch module 300_3 slides, various screen driving methods may be provided in the expanded exposure area CA, and user convenience may be increased.

Figure 16:
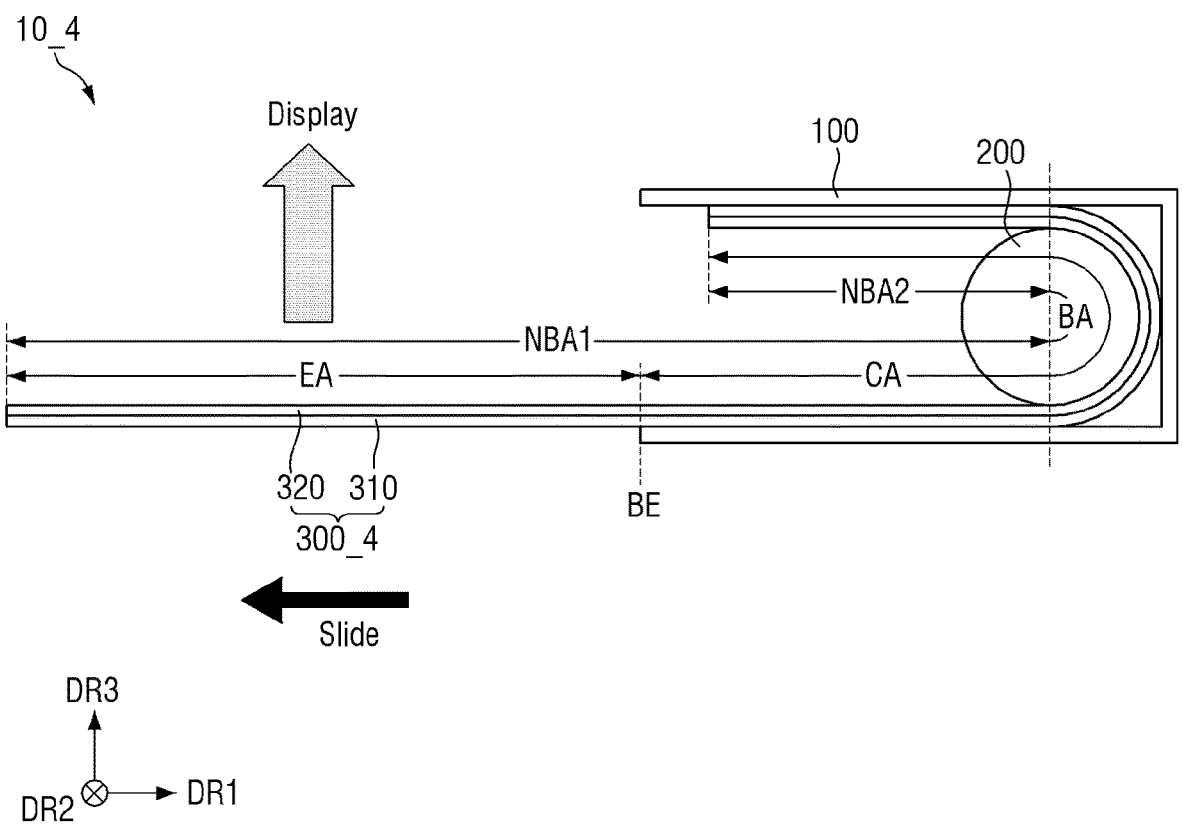
FIG. 16 is a cross-sectional view of a display device according to still another embodiment of the present disclosure.

FIG. 16 is a cross-sectional view of a display device according to still another embodiment.

Referring to FIG. 16, a display touch module 300_4 of a display device 10_4 according to the present embodiment is different from that of the embodiment of FIG. 2 in that it is in-bent or in-folded.

In the embodiment illustrated in FIG. 16, the display touch module 300_4 according to the present embodiment may be in-bent. In this embodiment, the first non-bending area NBA1 and the second non-bending area NBA2 may be bent such that the front surfaces thereof face each other (e.g., images displayed by the first non-bending area NBA1 and the second non-bending area NBA2 face each other), and an area where the screen of the display touch module 300_4 is displayed may be partially covered.

The non-exposed area CA of the display touch module 300_4 according to the present embodiment may include a second non-bending area NBA2 and a bending area BA, and may further include at least a part of the first non-bending area NBA1, but the present disclosure is not limited thereto. The exposed area EA of the display touch module 300_4 may include at least a part of the first non-bending area NBA1. As the display touch module 300_4 slides, the exposed area EA may be expanded.

Even in this embodiment, the screen may not be displayed in the non-exposed area CA of the active area AAR by sensing a capacitance of the touch member 320, calculating the exposure boundary EB, and determining the exposure boundary EB. Accordingly, unnecessary power consumption of the display device 10_4 may be reduced compared to an embodiment in which an image is displayed in the non-exposed area CA. In addition, as the display touch module 300_4 slides, various screen driving methods may be provided in the expanded exposure area CA, and user convenience may be increased.

In concluding the detailed description, those skilled in the art will appreciate that many variations and modifications can be made to the embodiments without substantially departing from the principles of the present disclosure. Therefore, the disclosed embodiments of the disclosure are used in a generic and descriptive sense only and not for purposes of limitation.

What is claimed is:

1. A display device, comprising:
a housing;
a display touch module including a non-exposed area covered by the housing, an exposed area located outside the housing, and an active area disposed over the non-exposed area and the exposed area, the display touch module including a display member configured to display a screen and a touch member on the display member and configured to sense a touch input, the touch member comprising a driving line and a sensing line; and
a boundary determining member configured to sense a capacitance of the touch member and calculate coordinates of an exposure boundary between the exposed area and non-exposed area of the display touch module based on the capacitance of the touch member in the exposed area including only a mutual capacitance between the driving line and the sensing line, and the capacitance of the touch member in the non-exposed area including the mutual capacitance and a self-capacitance between the driving line, the sensing line, and the housing,
wherein the display device is configured to adjust a display range of the active area according to the coordinates of the exposure boundary calculated by the boundary determining member.

2. The display device of claim 1, wherein the coordinates of the exposure boundary are changed according to a sliding of the display touch module.

3. The display device of claim 2, wherein the display device is configured to display an image in an active area of the exposed area, and wherein the display device is configured not to display an image in an active area of the non-exposed area.

4. The display device of claim 3, wherein, when the exposed area is expanded according to the sliding of the display touch module, the image displayed in the exposed area is expanded.

5. The display device of claim 1, wherein the display touch module is a flexible display touch module, and further includes a bending area, and a first non-bending area and a second non-bending area at opposite sides of the bending area, and
wherein the first non-bending area and the second non-bending area overlap each other in a thickness direction.

6. The display device of claim 5, wherein the exposed area includes at least a portion of the bending area and the first non-bending area, and
wherein the display device is configured to display an image in an active area of the exposed area, and is configured not to display an image in an active area of the non-exposed area.

7. The display device of claim 6, wherein the display device is configured to display the image in the first non-bending area, and is configured not to display the image in the bending area.

8. The display device of claim 1, wherein the boundary determining member includes a sensor configured to sense a capacitance of the touch member and a boundary calculator configured to calculate coordinates of the exposure boundary.

9. The display device of claim 8, wherein the sensor is electrically connected to the sensing line.

10. A method of driving a display device, which comprises a display touch module including a display member displaying an image and a touch member on the display member and configured to sense a touch input, the display touch module including a non-exposed area covered by a housing and an exposed area located outside the housing, the touch member including a drive line and a sensing line, the method comprising:
measuring a capacitance of the touch member and determining coordinates of an exposure boundary between the exposed area and the non-exposed area based on a mutual capacitance between the driving line and the sensing line being different in the exposed area than in the non-exposed area; and adjusting an area of the display member displaying the image according to the coordinates of the exposure boundary.

11. The method of claim 10, wherein the determining of the coordinates of the exposure boundary includes comparing the measured capacitance value with a capacitance threshold value.

12. The method of claim 11, wherein the determining of the coordinates of the exposure boundary comprises calculating coordinates where the measured capacitance value is equal to the capacitance threshold value.

13. The method of claim 12, wherein the determining of the coordinates of the exposure boundary is performed for each frame at which the touch member is driven, and wherein, when coordinates of the exposure boundary calculated in a nth frame are the same as coordinates of the exposure boundary calculated in a n-1th frame, the determining of the coordinates of the exposure boundary further includes increasing a frame count, wherein n is a natural number.

14. The method of claim 13, wherein the adjusting of the area of the display member displaying the image according to the coordinates of the exposure boundary is performed when the frame count is equal to or greater than a frame count threshold value.

15. The method of claim 10, in the determining of the coordinates of the exposure boundary, the coordinates of the exposure boundary change according to a sliding of the display touch module.

16. The method of claim 15, further comprising expanding the image displayed in the exposed area when the exposed area is expanded according to the sliding of the display touch module.

17. The method of claim 10, wherein the display touch module is a flexible display touch module, and further includes a bending area, and a first non-bending area and a second non-bending area located at opposite sides of the bending area, respectively, and wherein the first non-bending area and the second non-bending area overlap each other in a thickness direction.

18. The method of claim 17, wherein the exposed area includes at least a portion of the bending area and the first non-bending area, and wherein the method includes displaying the image in the first non-bending area, and not displaying the image in the bending area.

* * * * *